United States Patent
Ueno et al.

(10) Patent No.: US 6,806,644 B2
(45) Date of Patent: Oct. 19, 2004

(54) ELECTRONIC APPARATUS AND LIQUID CRYSTAL DISPLAY DEVICE FOR IRRADIATING ULTRAVIOLET RAY TO LUMINESCENT LAYER

(75) Inventors: Masato Ueno, Tokyo (JP); Tadao Hirano, Tokyo (JP); Shyuichi Machida, Tokyo (JP); Norihisa Usui, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 10/192,385

(22) Filed: Jul. 10, 2002

(65) Prior Publication Data

US 2003/0016315 A1 Jan. 23, 2003

(30) Foreign Application Priority Data

Jul. 17, 2001 (JP) ........................................ 2001-216775
Jun. 3, 2002 (JP) ........................................ 2002-161480

(51) Int. Cl.[7] .............................. H01J 1/64; G04B 19/32
(52) U.S. Cl. ...................... 313/512; 313/510; 313/513; 362/23; 368/226; 368/227
(58) Field of Search .............................. 313/501, 502, 313/506, 515, 510–513, 514, 522; 362/23, 27, 29; 368/223, 226, 227, 238, 67

(56) References Cited

U.S. PATENT DOCUMENTS

| | | | | |
|---|---|---|---|---|
| 1,994,950 A | * | 3/1935 | Charles | ........................ 362/23 |
| 2,823,512 A | * | 2/1958 | Van | ............................. 368/226 |
| 4,167,307 A | * | 9/1979 | Cirkler et al. | ................ 349/68 |
| 4,705,407 A | | 11/1987 | Brien | |
| 5,548,565 A | * | 8/1996 | Aoyama et al. | ............ 368/227 |
| 5,604,716 A | | 2/1997 | Cheung | |
| 6,106,270 A | * | 8/2000 | Hardin | ........................ 425/412 |
| 6,729,738 B2 | * | 5/2004 | Fuwausa et al. | .............. 362/84 |

FOREIGN PATENT DOCUMENTS

| | | | | |
|---|---|---|---|---|
| DE | 3819713 | * | 12/1989 | ........... G04B/19/10 |
| JP | 09-264969 | | 10/1997 | |

* cited by examiner

Primary Examiner—Ashok Patel
Assistant Examiner—German Colón
(74) Attorney, Agent, or Firm—Frishauf, Holtz, Goodman & Chick, P.C.

(57) ABSTRACT

An ultraviolet ray-emitting element is provided in a frame-like member disposed between an apparatus module and an apparatus case by corresponding to a peripheral portion of a protective glass. A light in an ultraviolet range from the ultraviolet ray-emitting element is irradiated between the module and the protective glass. A luminescent layer to which an ultraviolet ray is irradiated emits a light.

7 Claims, 22 Drawing Sheets

ELECTRONIC APPARATUS AND LIQUID CRYSTAL DISPLAY DEVICE FOR IRRADIATING ULTRAVIOLET RAY TO LUMINESCENT LAYER

BACKGROUND OF THE INVENTION

1. Field of the Invention

The present invention relates to an electronic apparatus, such as a wrist watch, a portable telephone or the like, and a liquid crystal display device.

2. Description of Related Art

For example, there is a wrist watch having a phosphorescent portion provided by applying a phosphorescent paint, such as a luminous paint or the like, partially to timepiece parts, such as a dial, hands and the like. The phosphorescent portion of the wrist watch saves energy by receiving an external light in a bright place, and the wrist watch emits a light in a dark place by the energy saved by the phosphorescent portion.

In such a wrist watch, the phosphorescent portion emits a light for a short time in a dark place, so that time can be recognized. However, the phosphorescent portion cannot emit a light when a user desires, or cannot emit a light for a long time.

Therefore, in earlier technology, it is proposed that the phosphorescent portion emits a light when a user desires by using a light source.

As this kind of wrist watch, there is one that a light guiding plate is disposed under the dial and a light source is disposed on the side of the light guiding plate and a light is guided from the light source and irradiated to the lower surface side of the dial, or there is one that a light source is disposed upward of the dial.

However, in the former wrist watch, there is a problem that the energy of the light cannot be saved sufficiently in the phosphorescent portion provided in the dial or the hands since the light from the light source becomes weak.

Further, in the latter wrist watch, although the energy of the light can be saved sufficiently in the phosphorescent portion in the dial or the hands if the light from the light source is made strong, there is no meaning for providing the phosphorescent portion since the upper side of the dial becomes bright by the light from the light source. Moreover, there is a problem that the disposed structure becomes complicated and the light source cannot be disposed easily since it is required to dispose the light source so that the light source does not obstruct the dial or the hands and is not broken by a shock, when the light source is disposed.

SUMMARY OF THE INVENTION

An object of the present invention is to dispose an ultraviolet ray-emitting portion so that an ultraviolet ray can be irradiated well to a luminescent layer and the ultraviolet ray-emitting portion does not become obstructive and is not broken by a shock.

Further, another object of the present invention is to obtain an electronic apparatus or a liquid crystal display device which achieves a backlight function at a luminescent layer and has an excellent decoration property.

Moreover, a further object of the present invention is to irradiate a light in the ultraviolet range emitted from the ultraviolet ray-emitting portion to the luminescent layer efficiently without damaging the light.

PREFERRED EMBODIMENT OF THE INVENTION

[First Embodiment]

Hereinafter, a first embodiment in which the present invention is applied to a wrist watch will be explained with reference to FIGS. 1 to 7.

Figure 1:
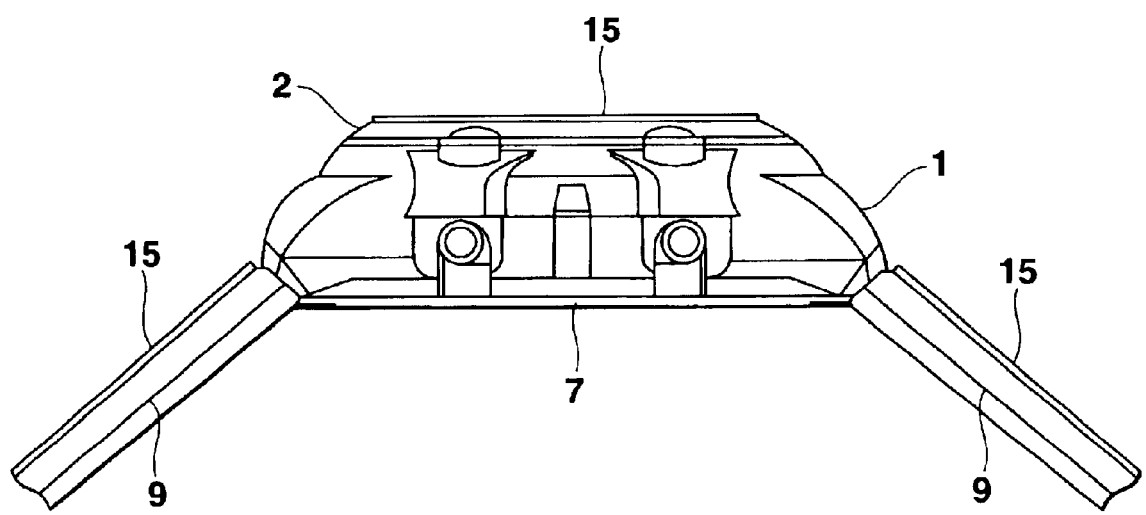
FIG. 1 is a side view showing an appearance of a wrist watch to which the present invention is applied.
Figure 2:
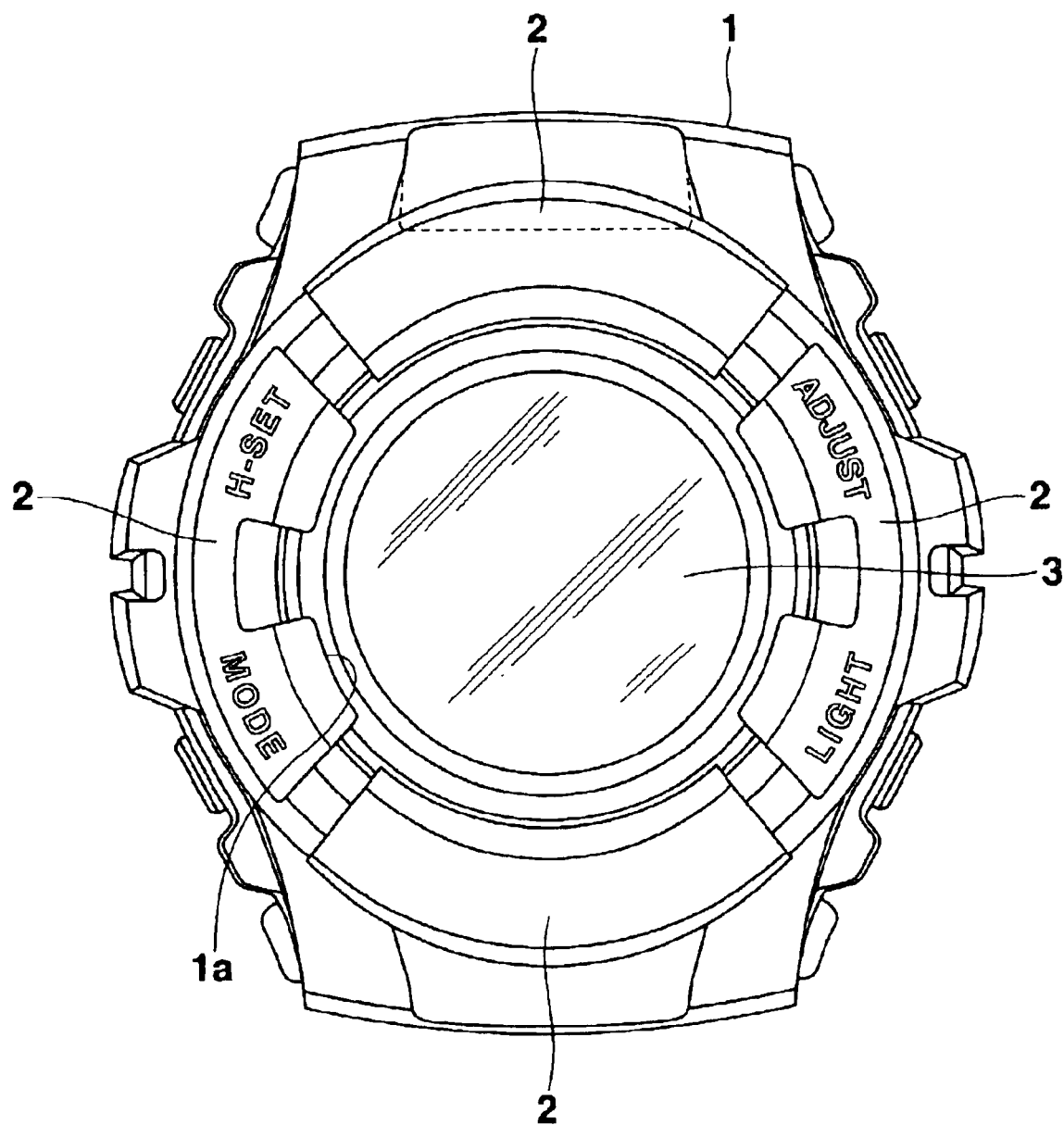
FIG. 2 is an enlarged plan view showing a wrist watch case in FIG. 1.
Figure 3:
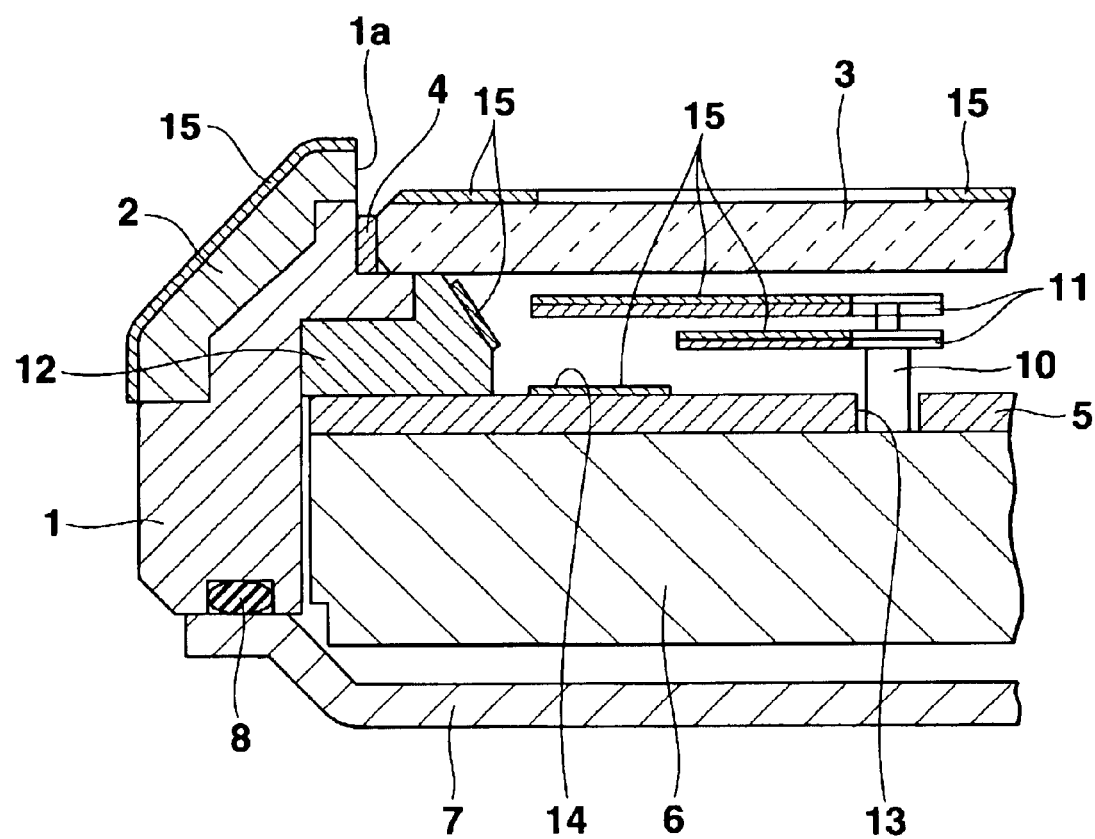
FIG. 3 is an enlarged cross sectional view showing a principal portion of an internal structure of the wrist watch in FIG. 1.

FIG. 1 is a side view showing the wrist watch, a portion of which is omitted. FIG. 2 is an enlarged plan view showing a wrist watch case which is the wrist watch in FIG. 1 without watch bands. FIG. 3 is an enlarged cross-sectional view showing a principal of an inner structure of the wrist watch case.

The wrist watch comprises a wrist watch case 1 as an apparatus case. As shown in FIG. 2, bezels 2 are provided on outer periphery in the upper portion of the wrist watch case 1. As shown in FIG. 3, a watch glass 3 is mounted on an aperture portion 1a provided in the center in the upper portion of the wrist watch case 1 via a packing 4. Further, in the inside of the wrist watch case 1, a dial 5 and a watch module 6 are contained. On the lower surface of the wrist watch case 1, a rear cover 7 is attached via a waterproof ring 8. Moreover, as shown in FIG. 1, watch bands 9 are attached to the twelve o'clock side and the six o'clock side of the wrist watch case 1.

The watch module 6 comprises at least an analog function between analog function and digital function. As shown in FIG. 3, a hand shaft 10 is projected to the upward of the dial 5, and hands 11, such as an hour hand, a minute hand and the like, are attached to the upper end portion of the projected hand shaft 10 so as to be moved. Further, on the inner peripheral surface of the wrist watch case 1, a blind member 12 is provided being in contact with the upper surface of the peripheral portion of the dial 5 and with the lower surface of the peripheral portion of the watch glass 3.

Figure 5:
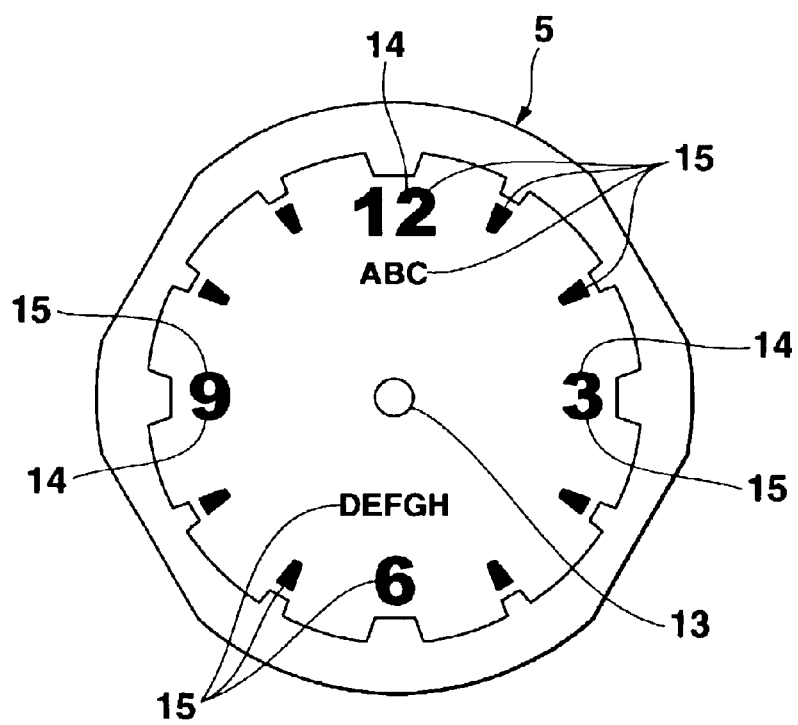
FIG. 5 is an enlarged plan view showing a dial in FIG. 3.

The dial 5 is a circular plate. A through hole 13 in which the hand shaft 10 is inserted is provided at the central portion of the dial 5. Time indices 14 are provided in the outer periphery of the upper surface of the dial 5, and the hands 11 are moved over the time indices 14 as shown in FIG. 5.

Figure 4:
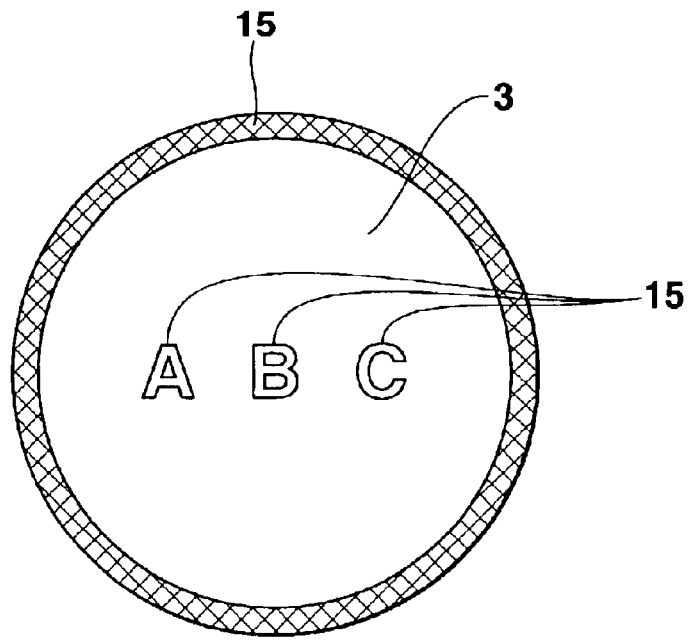
FIG. 4 is a plan view showing a watch glass in FIG. 3.
Figure 6:
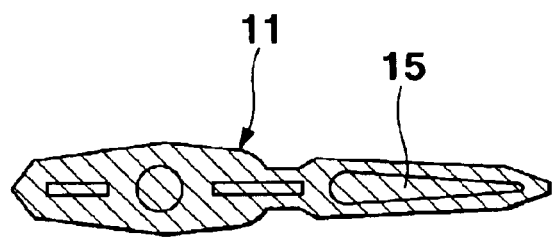
FIG. 6 is an enlarged plan view showing hands in FIG. 3.

Incidentally, luminescent layers 15 are provided on the bezels 2, the watch glass 3, the dial 5, the hands 11, the blind member 12, and the watch band 9, which are the timepiece parts of the wrist watch, respectively. For example, as shown in FIG. 4, the luminescent layers 15 are provided on the outer peripheral portion in the upper surface of the watch glass 3 and on predetermined points in the center (for example, on mark portions) of the watch glass 3. Further, as shown in FIG. 5, the luminescent layers 15 are provided on predetermined points (for example, on mark portions) in the upper surface of the dial 5 and on the upper surface of the time indices 14. As shown in FIG. 6, the luminescent layers 15 are provided on the whole upper surface of the hands 11. Moreover, as shown in FIGS. 1 and 2, the luminescent layers 15 are provided on the almost whole upper surface of each of the bezels 2 and the watch bands 9.

Figure 7:
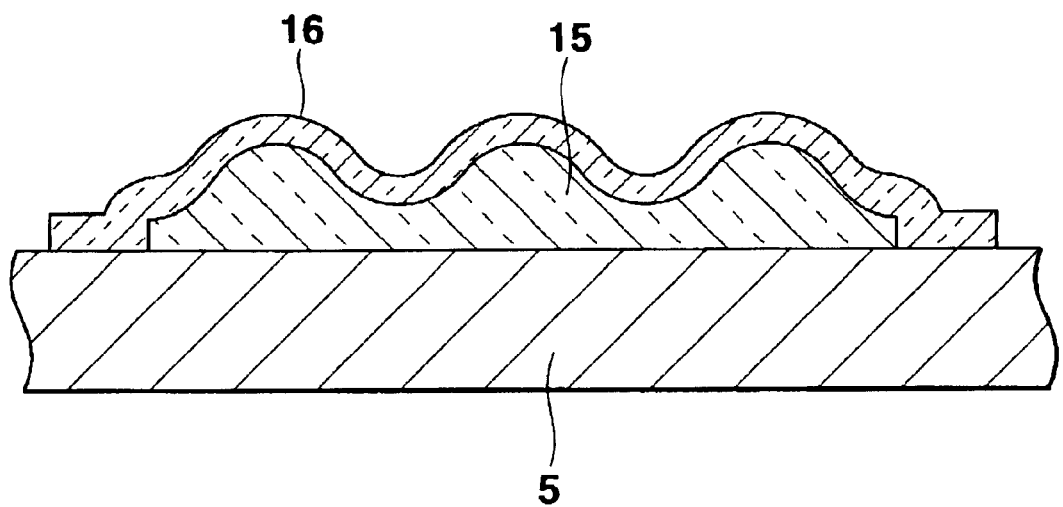
FIG. 7 is an enlarged cross sectional view showing a luminescent layer provided on the dial in FIG. 5.

These luminescent layers 15 emit colored lights by reacting to lights in an ultraviolet range with wavelength between 350 and 420 nm (nanometer: nano is one billionth) or between 254 and 365 nm. The luminescent layers 15 are in a transparent state when the light in the ultraviolet range is not irradiated. As shown in FIG. 7, the layer thickness of the luminescent layers 15 varies in a wave shape. The luminescent layers 15 are applied to the upper surface of each of the timepiece parts (the dial 5 is shown in FIG. 7), and are covered with a transparent overcoat film 16. When a light in the ultraviolet range is irradiated in this state, a hue is caused in a luminescent color in accordance with the layer thickness. Further, the luminescent color of these luminescent layers is based on green (yellow), blue, and red, and there are ten to thirteen kinds of color variation. In this case, all of the luminescent color of each luminescent layer in each timepiece parts may be the same color. However, in order to recognize time easily, it is desired that at least the luminescent color of each luminescent layer 15 of the dial 5 and the watch glass 3 is dissimilar to the luminescent color of the luminescent layers 15 of the hands 11. For example, it is desired that the luminescent layers 15 of the hands 11 emits a light with a color similar to red and each luminescent layers 15 of the dial 5 and the watch glass 3 emits a light with a color similar to blue.

According to such a watch wrist, in a place where a light in the ultraviolet range is hardly exposed, such as indoors or the like, the luminescent layers 15 provided on each timepiece parts, that is, on the bezels 2, the watch glass 3, the dial 5, the hands 11, the blind member 12, and the watch bands 9, respectively, are transparent. Therefore, the surface (material color) of each timepiece parts is not influenced by each luminescent layer 15, so that the surface of each timepiece parts can just be seen through. Further, in a place where a light in the ultraviolet range is exposed, such as outdoors or the like, the transparent luminescent layers 15 react to the light in the ultraviolet range and emit colored lights. Therefore, each timepiece parts, that is, the bezels 2, the watch glass 3, the dial 5, the hands 11, the blind member 12, and the watch bands 9 can be seen glittering, respectively.

At this time, time can be recognized easily by making the luminescent layers 15 of the hands 11 emit lights with a color dissimilar to each luminescent layer 15 of the dial 5 and the watch glass 3, for example, by making the luminescent layers 15 of the hands 11 emit lights with a color similar to red, and by making each luminescent layer 15 of the dial 5 and the watch glass 3 emit a light with a color similar to blue. In particular, as shown in FIG. 7, since the layer thickness of each luminescent layer 15 varies in a wave shape, and a hue is caused in a luminescent color in accordance with the layer thickness, a hue of the luminescent color can be represented by each luminescent layer 15. Thereby, a subtle representation, such as gradation or the like, becomes possible, and the one having high decoration effect can be obtained. In this case, since each luminescent layer 15 is protected by being covered with the transparent overcoat film 16, durability of each luminescent layer 15 can be improved. Moreover, since the luminescent layers 15 do not influence the workpieces which become the timepiece parts, it is possible to select materials of each timepiece parts freely.

Figure 8A:
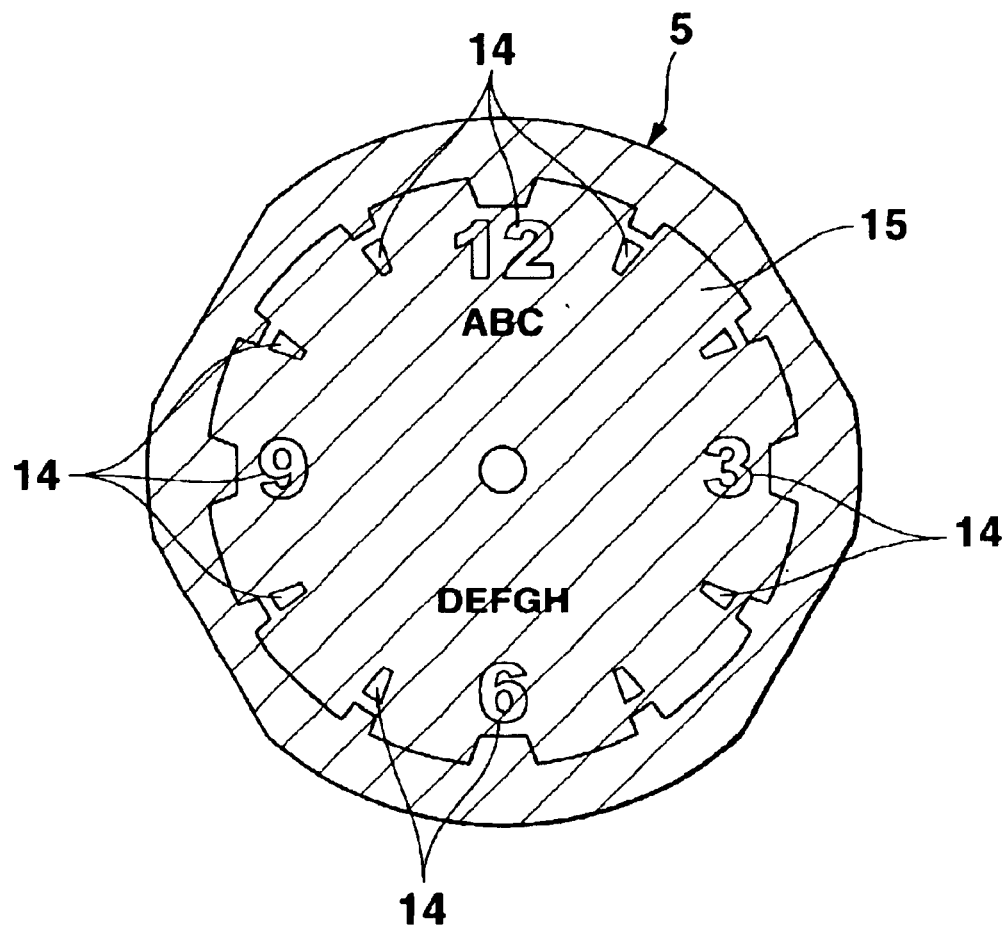
FIG. 8A is a view showing the luminescent layer being provided on the whole upper surface of the dial.
Figure 8B:
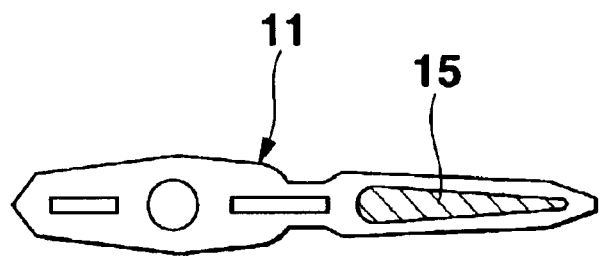
FIG. 8B is a view showing the luminescent layer being provided on a portion of the upper surface of the dial.

In addition, in the above-described first embodiment, the luminescent layer 15 is provided partially on the upper surface side of the dial 5, and the luminescent layers 15 are provided wholly on the upper surface of the hands 11, and the luminescent layer 15 is provided partially on the upper surface of the watch glass 3. However, it is not limited to this. For example, as shown in FIG. 8A, the luminescent layer 15 may be provided on the whole upper surface of the dial 5. Then, as shown in FIG. 8B, the luminescent layer 15 may be provided only on a portion of the hands 11, and the luminescent layer 15 may be provided wholly on the upper surface of the watch glass 3. In this case, each luminescent layer 15 of the dial 5 and the watch glass 3 may also emit a light dissimilar to the luminescent layers 15 of the hands 11. Even though it is made in such a construction, it has the same operation and effect as the first embodiment.

Figure 9:
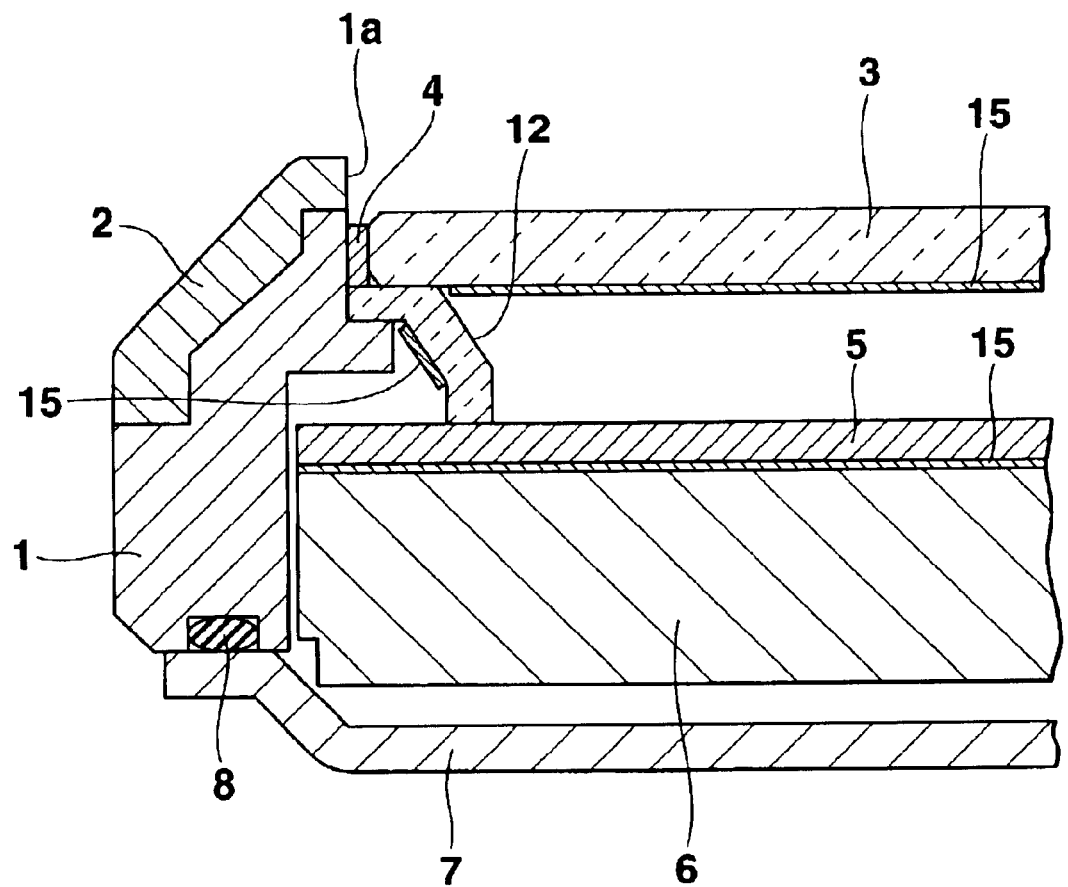
FIG. 9 is an enlarged cross sectional view showing a principal portion of the inside of the wrist watch when the luminescent layers are provided on each lower surface of the watch glass and the dial, and an inner surface of a blind member.
Figure 10:
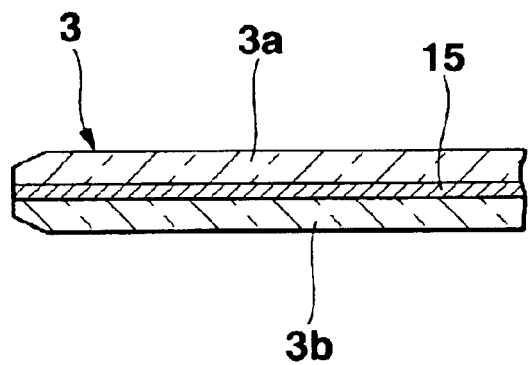
FIG. 10 is an enlarged cross sectional view showing a principal in the case that the watch glass is constructed by two glass plates and the luminescent layer is provided between the glass plates.

Further, in the above-described first embodiment, the luminescent layers 15 are provided on each upper surface of the watch glass 3 and the dial 5, and on the surface of the blind member 12, respectively. However, it is not limited to this. For example, as shown in FIG. 9, the luminescent layers 15 may be provided on the lower surface of the watch glass 3, and on the lower surface of the dial 5 if it is transparent. Further, the luminescent layer 15 may be provided on the inner surface of the blind member 12 if it is transparent. Moreover, as shown in FIG. 10, when the watch glass 3 has a structure that two glass plates 3a and 3b are stuck together, the luminescent layer 15 may be sandwiched between the two glass plates 3a and 3b. In either of such a structure, the same operation and effect as the first embodiment can also be obtained.

Figure 11:
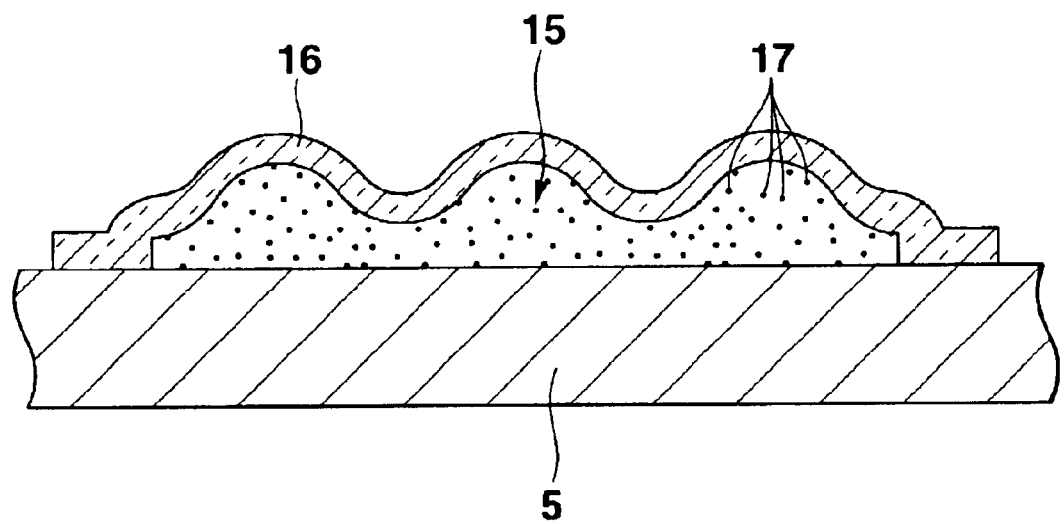
FIG. 11 is an enlarged cross sectional view showing a principal portion when phosphorescent materials are mixed in the luminescent layer.

Moreover, in the above-described first embodiment, although the case that each luminescent layer 15 is formed by changing its layer thickness in a wave shape is mentioned, it is not limited to this. For example, it may be formed by changing the layer thickness in a steps shape. Further, as shown in FIG. 11, phosphorescent materials 17 may be mixed into the luminescent layers 15. Thus, when the phosphorescent materials 17 are mixed, the phosphorescent materials 17 save energy from the lights emitted from the luminescent layers 15. Then, since the phosphorescent materials 17 emit lights as afterglow after the light in the ultraviolet range is irradiated, it can have an afterglow function, and thereby, the one having high decoration property can also be obtained.

[Second Embodiment]

Figure 12:
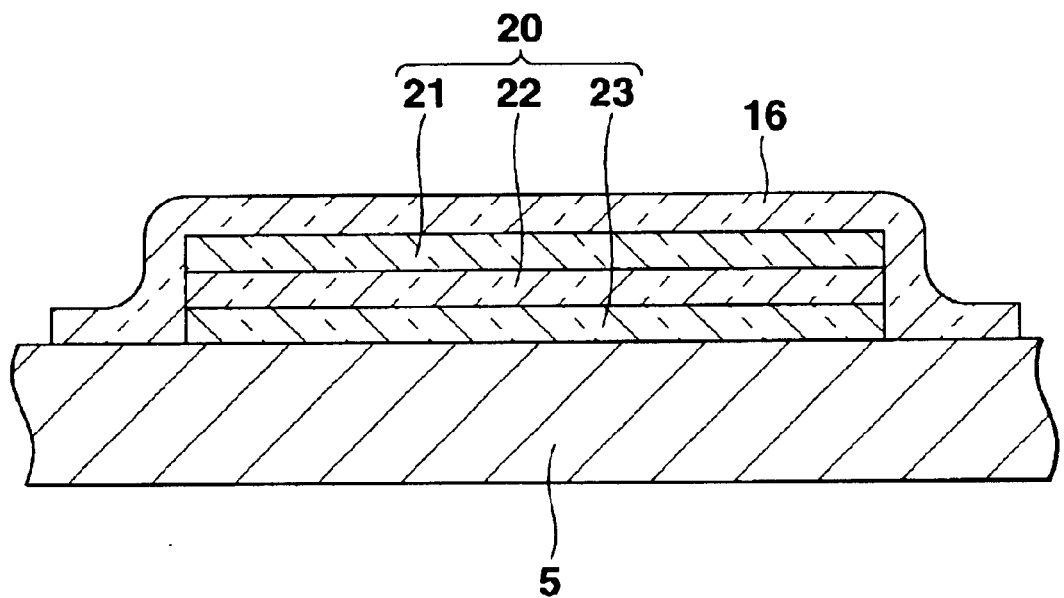
FIG. 12 is an enlarged cross sectional view showing a principal portion when a laminated structure of luminescent layers is provided on a dial in a wrist watch to which a second embodiment according to the present invention is applied.

Next, a second embodiment in which the present invention is applied to a wrist watch will be explained with reference to FIG. 12. The same reference numerals are attached to the same elements as the first embodiment and each of its modified examples shown in FIGS. 1 to 11 in order to explain the second embodiment.

The wrist watch has a structure that a transparent luminescent layer 20 having a laminated structure is provided on the upper surface of the dial 5. The other structures of the wrist watch is approximately the same as those of the first embodiment.

That is, the transparent luminescent layer 20 has a structure that a first to third luminescent films 21 to 23 which emit light with color dissimilar to each other by reacting to the light in the ultraviolet range are laminated. The transparent luminescent layer 20 is provided on predetermined points (for example, in mark portions) and/or on the upper surface of the time indices 14, in the upper surface of a dial 5.

In this case, the first to third luminescent films 21 to 23 emit lights with dissimilar colors by reacting to the light in the ultraviolet range (with a wavelength between 350 and 420 nm), respectively, and are in a transparent state when the light in the ultraviolet range is not irradiated. The luminescent colors of those films 21 to 23 are based on green (yellow), blue, and red, and there are ten to thirteen kinds of color variations, respectively. For example, the first luminescent film 21 emits a light with a color similar to green (yellow), the second luminescent film 22 emits a light with a color similar to blue, and the third luminescent film 23 emits a light with a color similar to red. Thereby, the whole of the luminescent layer 20 emits a luminescent color (a mixed color) in which each luminescent color of the first to third luminescent films 21 to 23 is mixed. In this case, the luminescent layer 20 is also covered with the transparent overcoat film 16.

According to such a wrist watch, in a place where a light in the ultraviolet range is hardly exposed, such as indoors or the like, since the luminescent layer 20 provided on the dial 5 is transparent, the surface (material color) of the dial 5 is not influenced by the luminescent layer 20, so that the surface of the dial 5 can be seen though. Further, in a place where a light in the ultraviolet range is exposed, such as outdoors or the like, since the first to third luminescent films 21 to 23 emit lights with colors dissimilar to each other by reacting to the light in the ultraviolet range, respectively, and these dissimilar luminescent colors are mixed, the whole luminescent layer 20 can emit a light in a subtle tint. Thereby, the predetermined points of the dial 5 can be seen glittering in a subtle tint.

At this time, the reactions of the first to third luminescent films 21 to 23 are different from each other in accordance with the wavelength or the optical intensity of the light in the ultraviolet range, and the brightness of each luminescent color of the first to third luminescent films 21 to 23 is changed in accordance with this difference in reaction. Therefore, the mixed color of the whole luminescent layer 20 is also changed subtly in accordance with the wavelength or the optical intensity of the light in the ultraviolet range. Since the luminescent color of the whole luminescent layer 20 is changed subtly in accordance with the wavelength or the optical intensity of the light in the ultraviolet range, subtle changes in color of the whole luminescent layer 20 can be represented, and thereby, the one having high decoration effect can be obtained.

In addition, in the above-described second embodiment, although the luminescent layer 20 has three-layer structure, it is not limited to this. It may have two-layer structure, or four-or-more-layer structure.

Further, in the above-described second embodiment, although the luminescent layer 20 is provided on the dial 5, it is not limited to this. It may be provided on each timepiece parts, such as bezels 2, a watch glass 3, hands 11, a blind member 12, and e watch bands 9 or the like, in the same way as the first embodiment. In this case, it is also desired that the luminescent color (the mixed color) of the luminescent layers 20 of the hands 11 is dissimilar to the luminescent color (the mixed color) of each luminescent layer 20 of the dial 5 and the watch glass 3.

Moreover, also in the above-described second embodiment, phosphorescent materials 17 may be mixed into the luminescent layer 20 in the same way as the modified example of the first embodiment shown in FIG. 11. Thus, when the phosphorescent materials 17 are mixed, the phosphorescent materials 17 save energy from the light emitted from the luminescent layer 20. Then, since the phosphorescent materials 17 emit lights as afterglow after the light in the ultraviolet range is irradiated, it can have an afterglow function, and thereby, the one having high decoration property can also be obtained.

[Third Embodiment]

Next, a third embodiment in which the present invention is applied to a wrist watch will be explained with reference to FIGS. 13 and 14. In this case, the same reference numerals are also attached to the same elements as the first embodiment and each of its modified examples shown in FIGS. 1 to 11 in order to explain the third embodiment.

The wrist watch has a structure that a transparent luminescent layer 25 in which dot-like luminescent portions 26 are arranged is provided on the upper surface of a dial 5. The other structures of the wrist watch is approximately the same as those of the first embodiment.

That is, the transparent luminescent layer 25 has a structure that numbers of dot-like luminescent portions 26 are arranged in dot-like by printing.

In this case, the dot-like luminescent portions 26 emit lights with dissimilar colors by reacting to the light in the ultraviolet range (with a wavelength between 350 and 420 nm), and are in a transparent state when the light in the ultraviolet range is not irradiated. The luminescent color of each dot-like luminescent portion 26 is based on green (yellow), blue, and red, and there are ten to thirteen kinds of color variations. Then, these dot-like luminescent portions 26 are arranged so that a predetermined figure, for example, a figure of a whale as shown FIG. 14, can be represented in color by selecting the luminescent color appropriately. In this case, each dot-like luminescent portion 26 which is the luminescent layer 25 is covered with a transparent overcoat film 16.

According to such a wrist watch, in a place where a light in the ultraviolet range is hardly exposed, such as indoors or the like, since each dot-like luminescent portion 26 of the luminescent layer 25 provided on the dial 5 is transparent, the surface (material color) of the dial 5 is not influenced by the luminescent layer 25, so that the surface of the dial 5 can be just seen through. Further, in a place where a light in the ultraviolet range is exposed, such as outdoors or the like, each dot-like luminescent portion 26 of the luminescent layer 25 reacts to the light in the ultraviolet range and emits a light with selected dissimilar color. Therefore, the figure of the whale as shown in FIG. 14 can be represented in color, and thereby, the one having high decoration effect can be obtained.

In addition, in the above-described third embodiment, although the luminescent layer 25 is provided on the dial 5, it is not limited to this. It may be provided on each timepiece parts, such as bezels 2, a watch glass 3, hands 11, a blind member 12, and watch bands 9 or the like, in the same way as the first embodiment and its modified examples.

Further, also in the above-described third embodiment, phosphorescent materials 17 may be mixed into each dot-like luminescent portion 26 of the luminescent layer 25 in the same way as the modified example of the first embodiment shown in FIG. 11. Thus, when the phosphorescent materials 17 are mixed, the phosphorescent materials 17 in each dot-like luminescent portion 26 save energy from the light emitted from each dot-like luminescent portion 26. Then, since the phosphorescent materials 17 emit lights as afterglow after the light in the ultraviolet range is irradiated, it can have an afterglow function, and thereby, the one having high decoration property can also be obtained.

Figure 15:
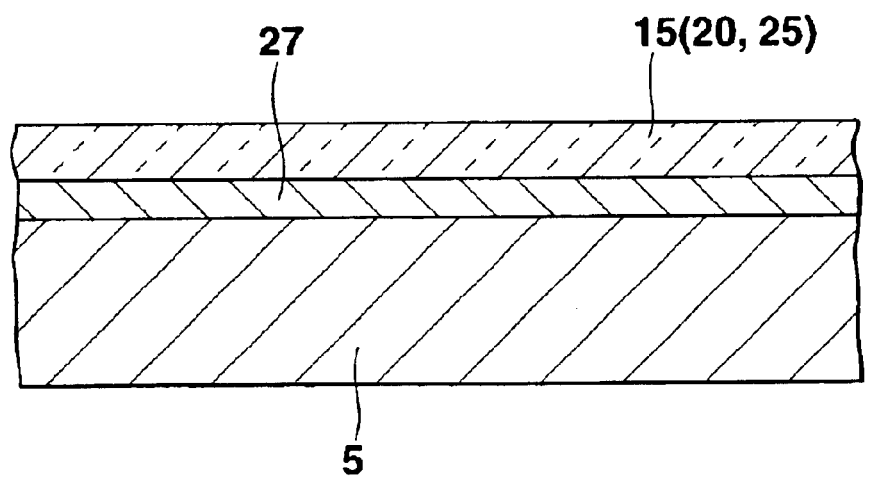
FIG. 15 is an enlarged cross sectional view showing a principal portion when the luminescent layer is provided on an upper surface of the dial which is a timepiece parts through an undercoat film.

Further, in the above-described first to third embodiments, although the case that each luminescent layer 15, 20 and 25 is provided directly on the surface of the timepiece parts is mentioned, it is not limited to this. For example, as shown in FIG. 15, an undercoat film 27 as a primer may be provided on the upper surface of the dial 5 which is a timepiece parts, and each luminescent layer 15, 20 and 25 may be provided on the upper surface of the undercoat film 27. If it is made in such a construction, since the undercoat film 27 achieves a primer function, corrosion resistance and adhesive property can be improved. Therefore, each luminescent layer 15, 20 and 25 can be provided certainly even though the dial 5 is made of metal or of synthetic resign. In this case, although it is not shown in the figure, it is desired that each luminescent layer 15, 20 and 25 is covered with the overcoat film 16.

[Fourth Embodiment]

Next, a fourth embodiment in which the present invention is applied to a wrist watch will be explained with reference to FIGS. 16 and 17. In this case, the same reference numerals are also attached to the same elements as the first embodiment and each of its modified examples shown in FIGS. 1 to 11 in order to explain the fourth embodiment.

Figure 16:
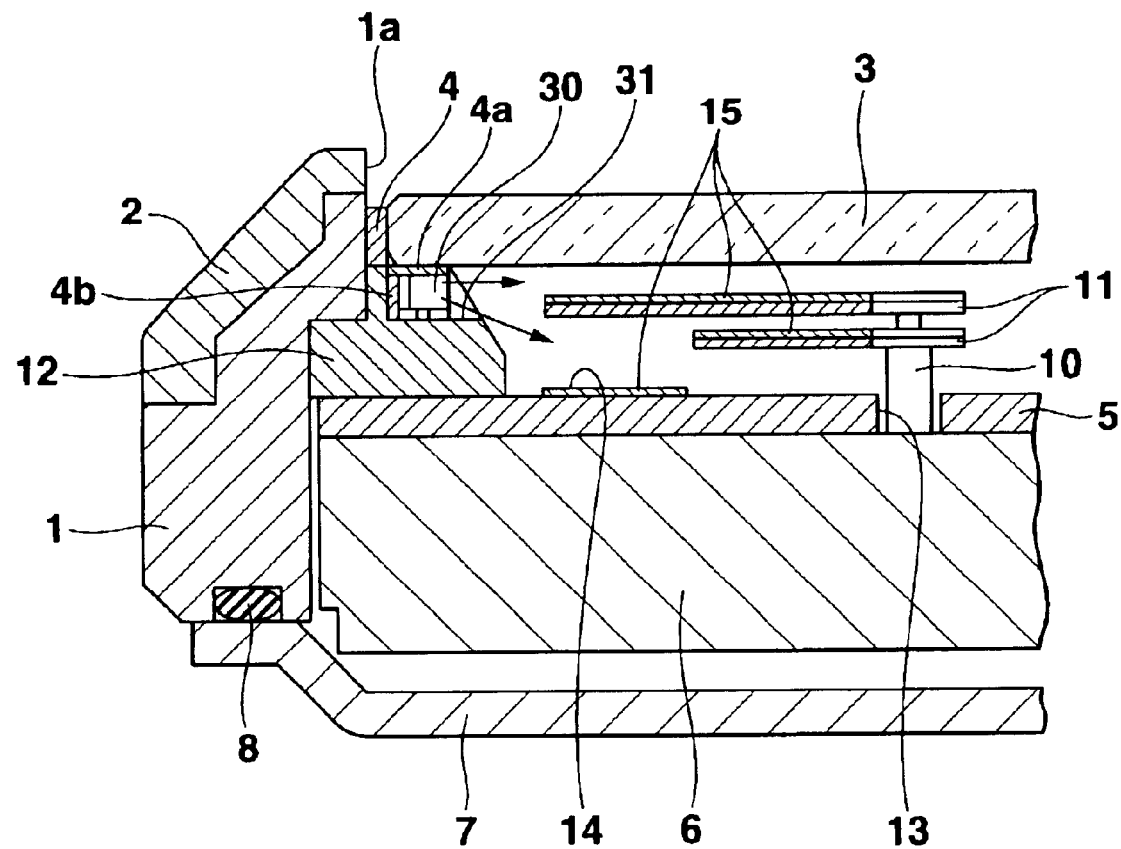
FIG. 16 is an enlarged cross sectional view showing a principal portion of an internal structure of a wrist watch to which a fourth embodiment according to the present invention is applied.
Figure 17:
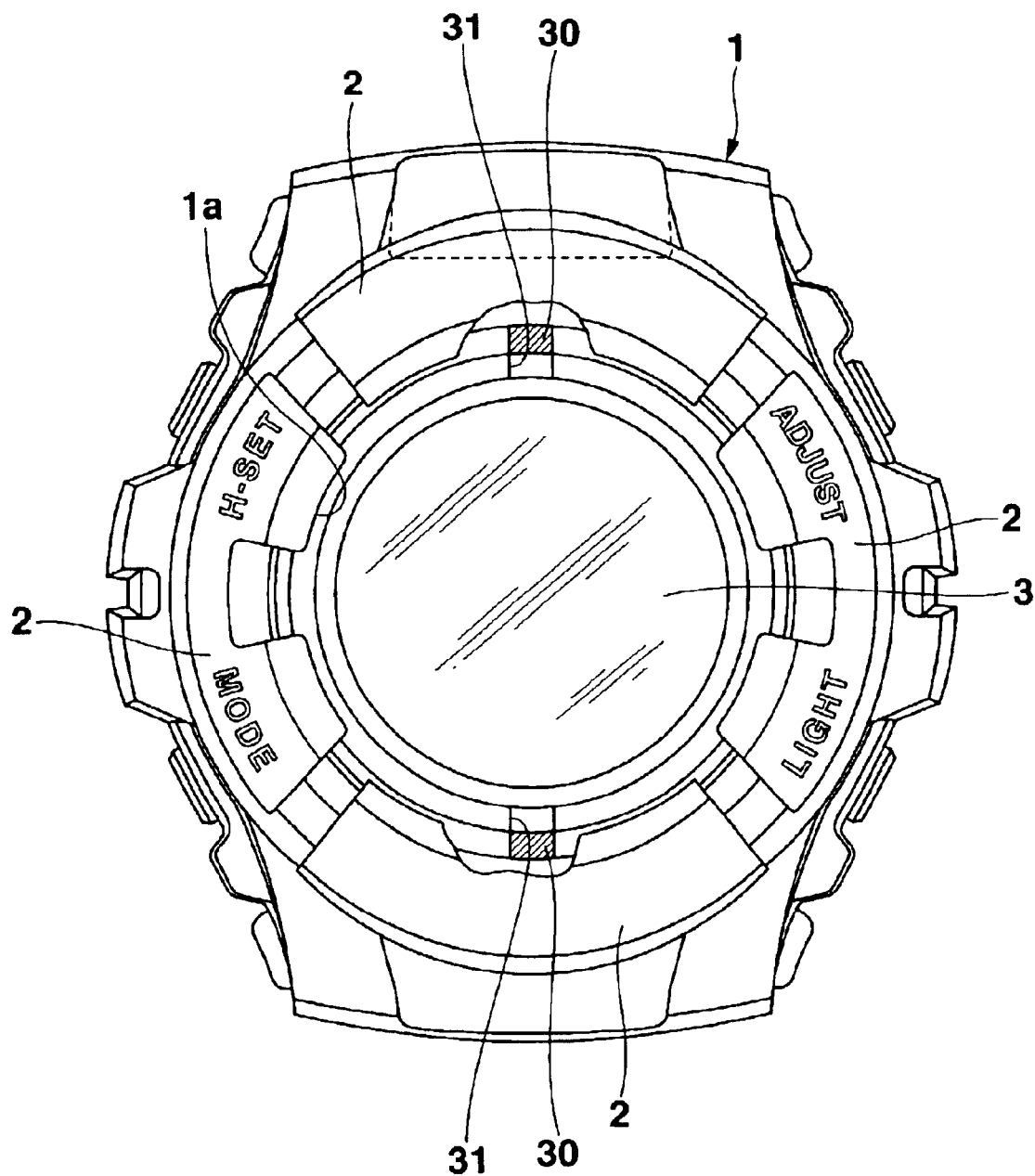
FIG. 17 is an enlarged plan view showing the wrist watch in FIG. 16.

As shown in FIGS. 16 and 17, the wrist watch has a structure that an ultraviolet ray-emitting elements 30 for emitting an ultraviolet ray into the wrist watch case 1 are provided. The other structures of the wrist watch is approximately the same as those of the first embodiment.

That is, the ultraviolet ray-emitting element 30 comprises a light-emitting element, such as an ultraviolet lamp (which is called a black light), an ultraviolet ray-emitting diode (LED) or the like, for emitting an ultraviolet ray whose wavelength is in the vicinity of 365 nm or between 254 and 365 nm. The ultraviolet ray-emitting elements 30 are formed as an ultraviolet ray-emitting portion.

The ultraviolet ray-emitting element 30 is disposed in a concave portion 31 which is a space portion provided in each upper portion in the twelve o'clock side and the six o'clock side of the blind member 12. A blind member 12 is a frame-like member which also comprises a function as a protect member or a cushion member. The ultraviolet ray-emitting elements 30 irradiate the emitted ultraviolet ray to a dial 5 and hands 11 from obliquely upward of them. The above-mentioned blind member 12, which is a frame-like member, is disposed between the module 6 and the watch case 1, which is an apparatus case, corresponding to the peripheral portion of the aperture portion 1a.

Each of the ultraviolet ray-emitting elements 30 is disposed in the concave portion 31 formed in the blind member 12, which also comprises a function as a protect member or a cushion member in the wrist watch case 1. Therefore, even though an exterior shock from the watch glass 3 direction is given, these ultraviolet ray-emitting elements 30 are protected or cushioned from the shock by a protective action or a cushioning action of the blind member 12, which also comprises a function as a protect member or a cushion member. In addition, in this example, cushioning materials 4a and 4b are disposed on both upper surface and side surface of the ultraviolet ray-emitting elements 30. Therefore, the ultraviolet ray-emitting elements 30 can be further protected from the shock from the outside.

In addition, in this example, since switches and the like are provided in the three o'clock side and the nine o'clock side, the ultraviolet ray-emitting elements 30 are provided in two portions where the switches and the like are not provided, which are the twelve o'clock side and the six o'clock side of the blind member 12. However, when the switches and the like are not provided in the three o'clock side and the nine o'clock side, these ultraviolet ray-emitting elements may be provided in the three o'clock side and the nine o'clock side.

In this case, the concave portion 31 of the blind member 12 is located between the lower surface of the watch glass 3 and the upper portion of the blind member 12. Thereby, the ultraviolet ray-emitting elements 30 are disposed more upward than the dial 5 and the hands 11. Further, on each upper surface of the dial 5 and the hands 11, the luminescent layers 15, which emit colored lights by reacting to the light in the ultraviolet range, are provided in the same way as the first embodiment. In this case, the luminescent layer 15 of the dial 5 also emits a light dissimilar to the luminescent layers 15 of the hands 11. Further, as shown in FIG. 7, these luminescent layers 15 are formed so as to change their layer thickness in a wave shape. Thereby, a hue is causes in the luminescent color in accordance with the layer thickness when the light in the ultraviolet range is irradiated. As shown in FIG. 15, these luminescent layers 15 may be provided on the flat upper surface of the dial 5.

According to such a wrist watch, as the same as the first embodiment, in a place where a light in the ultraviolet range is hardly exposed, such as indoors or the like, each surface of the dial 5 and the hands 11 can be seen through the transparent luminescent layers 15. Further, in a place where a light in the ultraviolet range is exposed, such as outdoors or the like, each luminescent layer 15 of the dial 5 and the hands 11 can be seen glittering. In particular, in a place where a light in the ultraviolet range is hardly exposed, such as indoors or the like, when the ultraviolet ray-emitting elements 30 are turn on so as to generate an ultraviolet ray, each luminescent layer 15 of the dial 5 and the hands 11 emits a colored light by reacting to the ultraviolet ray. Therefore, each luminescent layer 15 of the dial 5 and the hands 11 can emit the light compulsorily, so that it is possible to emit lights freely from the luminescent layers 15 in a desired place. Thus, when each luminescent layer 15 emits a light, the luminescent layer 15 of the dial 5 emits a light with a color dissimilar to the luminescent layers 15 of the hands 11, as the same as the first embodiment. Therefore, time can be recognized even in a dark place. Moreover, since the layer thickness of each luminescent layer 15 is changed in a wave shape, and a hue is caused in luminescent color in accordance with the layer thickness, a hue in the luminescent color by each luminescent layer 15 can be represented. Thereby, the one having high decoration effect can be obtained.

Further, in this wrist watch, the ultraviolet ray-emitting elements 30 are provided in the blind member 12 disposed between the dial 5 and the watch glass 3 by corresponding to the peripheral portion of the watch glass 3. Therefore, the ultraviolet ray-emitting elements 30 do not obstruct the dial 5 and the hands 11, and the ultraviolet ray-emitting elements 30 can be protected by the blind member 12 so as not to be broken by receiving a shock or the like. Further, an ultraviolet ray can be irradiated well between the dial 5 and the watch glass 3 from the ultraviolet ray-emitting elements 30. Thereby, the ultraviolet ray can be irradiated certainly and well to the luminescent layers 15, so that the luminescent layers 15 can emit lights sufficiently. In this case, since the ultraviolet ray-emitting elements 30 are provided close to the lower surface of the watch glass 3 in the upper portion of the blind member 12, the ultraviolet ray can be irradiated still better between the dial 5 and the watch glass 3.

In addition, in the above-described fourth embodiment, although the luminescent layers 15 are provided on the dial 5 and the watch glass 3, it is not limited to this. The luminescent layer 15 may be provided on each timepiece parts, such as bezels 2, the watch glass 3, hands 11, the blind member 12, and watch bands 9 or the like, in the same way as the first embodiment and its modified examples.

Further, in the above-described fourth embodiment, although each of the luminescent layers 15 has a structure that the layer thickness is changed in a wave shape, it is not limited to this. For example, it may be the luminescent layer 20 in which a plurality of luminescent films 21 to 23 are laminated, as in the second embodiment, or it may be the luminescent layer 25 in which the dot-like luminescent portions 26 are arranged in dot-like, as in the third embodiment.

In this case, phosphorescent materials 17 may also be mixed into each luminescent layer 15, 20 and 25 in the same way as the modified example of the first embodiment shown in FIG. 11, and it may have an afterglow function. Accordingly, time interval for making the ultraviolet ray-emitting elements 30 emit lights in a constant interval can be made long, and reduction of power consumption can be attempted.

Further, in the above-described fourth embodiment, the ultraviolet ray-emitting elements 30 are provided in two portions, which are in the twelve o'clock side and in the six o'clock side of the blind member 12. However, the ultraviolet ray-emitting elements 30 may be provided in three or more portions at unequal intervals or at equal intervals.

Moreover, in the above-described fourth embodiment, although the case that the ultraviolet ray-emitting elements 30 are disposed at the upper portion of the blind member 12 is mentioned, it is not limited to this. For example, the ultraviolet ray-emitting elements 30 may be disposed in the blind member 12, as shown in FIGS. 18A and 18B.

Figure 18A:
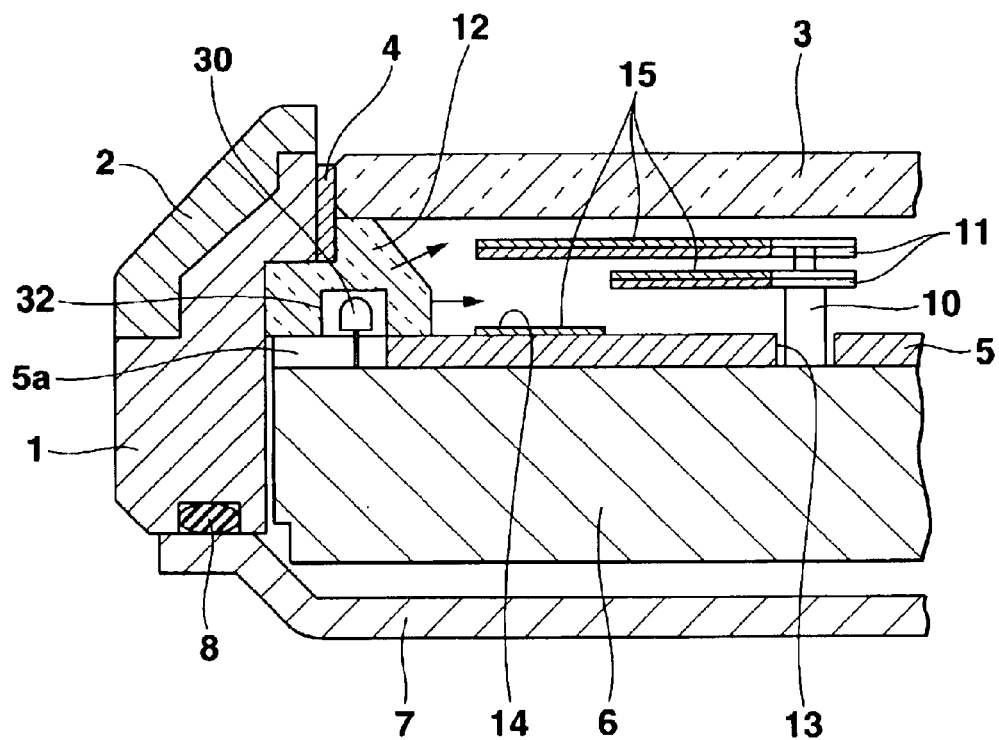
FIG. 18A is an enlarged cross sectional view showing a principal portion of a structure that an ultraviolet lamp is disposed in a transparent blind member.
Figure 18B:
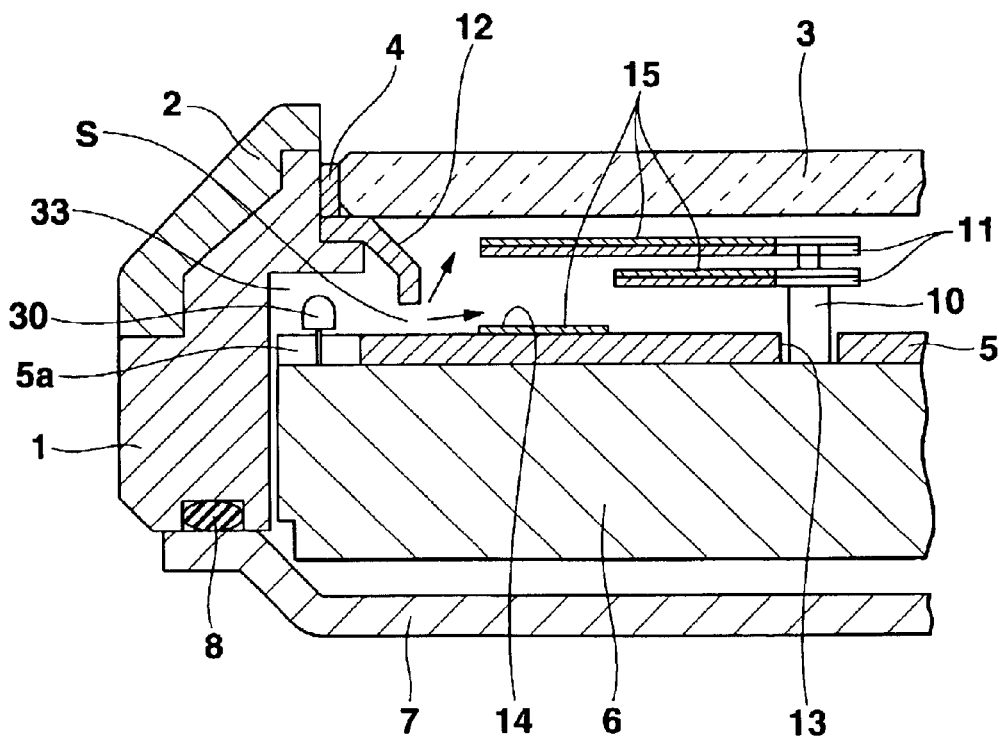
FIG. 18B is an enlarged cross sectional view showing a principal portion of a structure that the ultraviolet lamp is disposed in a space portion provided between the blind member and an inner surface of a wrist watch case and an ultraviolet ray is irradiated through a space between the blind portion and a dial.

That is, as shown in the modified example in FIG. 18A, the blind member 12 may be formed with a transparent material, and the concave portion 32 may be provided in the inside of the blind member 12, the lower side of the concave portion 32 being opened. Then, the ultraviolet ray-emitting elements 30 may be disposed in the concave portion 32 via a cutout portion 5a of the dial 5, and an ultraviolet ray generated by the ultraviolet ray-emitting elements 30 may be transmitted through the blind member 12 and irradiated in the upper side of the dial 5. Further, as shown in the modified example in FIG. 18B, a space portion 33 may be provided between the blind member 12 and the inner surface of the wrist watch case 1, and a space S may be provided between the lower end portion of the blind member 12 and the upper surface of the dial 5. Then, the ultraviolet ray-emitting elements 30 may be disposed in the space portion 33 via the cutout portion 5a of the dial 5, and the ultraviolet ray generated by the ultraviolet ray-emitting elements 30 may be irradiated to the upper side of the dial 5 through the space S between the blind member 12 and the dial 5. In either of the structures, not only the same operation and effect as the fourth embodiment can be obtained, but also the ultraviolet ray-emitting elements 30 can be protected certainly by each blind member 12, particularly.

Figure 19:
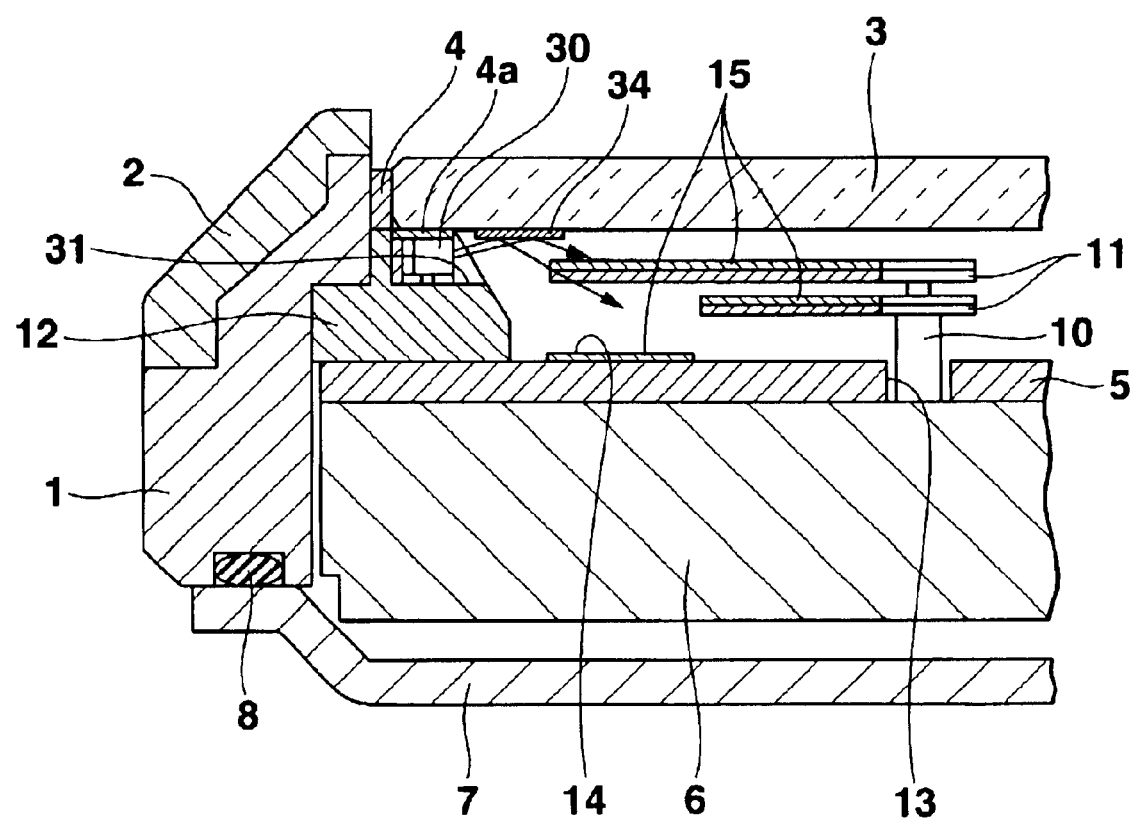
FIG. 19 is an enlarged cross sectional view showing a principal portion of a structure that the ultraviolet ray from the ultraviolet lamp is reflected in a reflecting surface provided on a lower surface of a watch glass.

Moreover, in the above-described fourth embodiment and each modified example, although the ultraviolet ray generated by the ultraviolet ray-emitting elements 30 are irradiated directly to the dial 5 or the hands 11, it is not limited to this. For example, as shown in FIG. 19, a reflection portion 34 may be provided on the lower surface of the watch glass 3 located in the direction which the ultraviolet ray progresses, and the ultraviolet ray from the ultraviolet ray-emitting elements 30 may be reflected in the reflection portion 34 and irradiated to the dial 5 or the hands 11. According to such a structure, since the ultraviolet ray may be reflected in the reflection portion 34, the ultraviolet ray from the ultraviolet ray-emitting elements 30 can be irradiated efficiently to the dial 5 or the hands 11.

[Fifth Embodiment]

Next, a fifth embodiment in which the present invention is applied to a wrist watch will be explained with reference to FIG. 20. In this case, the same reference numerals are also attached to the same elements as the first embodiment and each of its modified examples shown in FIGS. 1 to 11 in order to explain the fifth embodiment.

The wrist watch has a structure that a watch module 40 comprises a digital function. The other structures of the wrist watch is approximately the same as those in the first embodiment.

That is, the watch module 40 comprises a reflective liquid crystal display device 41 for displaying information, such as time or the like. The watch module 40 is contained in a wrist watch case 1 via a blind member 12, as the same as the first embodiment.

The blind member 12 is provided on the inner peripheral surface of the wrist watch case 1 in a state that the upper surface of the peripheral portion of the liquid crystal display device 41 is in contact with the lower surface of the peripheral portion of the watch glass 3.

Figure 20:
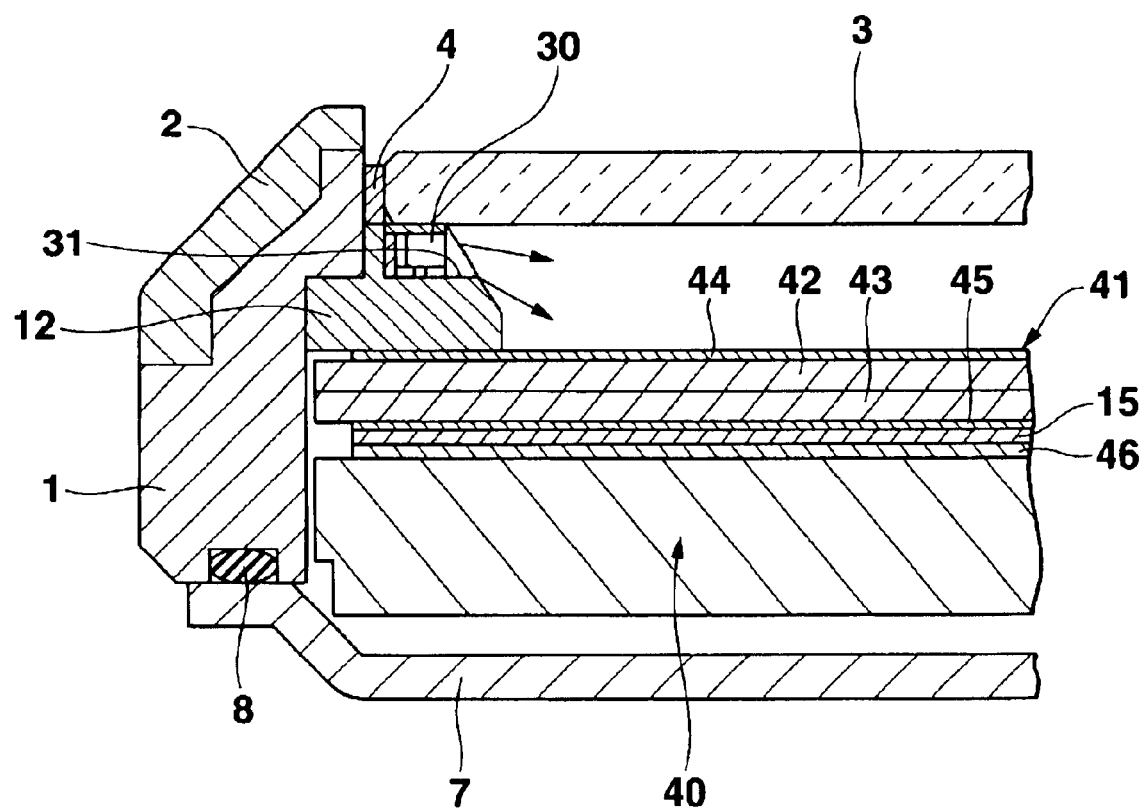
FIG. 20 is an enlarged cross sectional view showing a principal portion of an internal structure of a wrist watch to which a fifth embodiment according to the present invention is applied.

As shown in FIG. 20, a liquid crystal (not shown) is enclosed between a pair of transparent electrode printed circuit boards (PCBs) 42 and 43 which are disposed up and down. An ultraviolet ray transmissive upper polarizing plate 44 is provided on the upper surface of the electrode PCB 42 in the upper side, and an ultraviolet ray transmissive lower polarizing plate 45 is provided on the lower surface of the electrode PCB 43 in the lower side. Then, the transparent luminescent layer 15 is provided on the whole lower surface of the lower polarizing plate 45, and a reflector 46 is provided on the lower surface of the luminescent layer 15. Thus, the liquid crystal display device 41 has a reflective structure. In this case, each of the up-and-down polarizing plates 44 and 45 has a structure for transmitting al least a light in the visible range and a light in the ultraviolet range. That is, in a general polarizing plate, an ultraviolet ray-cutting treatment is performed, however, each of the polarizing plates 44 and 45 in the embodiment has a structure that the ultraviolet ray-cutting treatment is not performed.

Further, the luminescent layer 15 has the same structure as the first embodiment shown in FIG. 7. That is, it reacts to a light in the ultraviolet range (with a wavelength between 350 and 420 nm) and emits a colored light, and is in a transparent state when a light in the ultraviolet range is not irradiated. As shown in FIG. 7, the luminescent layer 15 is formed such that the layer thickness thereof is changed in a wave shape. When the light in the ultraviolet range is irradiated, a hue is caused in a luminescent color in accordance with the change in the layer thickness.

Moreover, as the same as the fourth embodiment, ultraviolet ray-emitting elements 30 for emitting a light in the ultraviolet range are provided in the wrist watch case 1. That is, the ultraviolet ray-emitting elements 30 are disposed in a concave portion 31 provided on the upper portion in each of the twelve o'clock side and the six o'clock side of the blind member 12 in the wrist watch case 1. The emitted ultraviolet ray is irradiated to the upper surface of the liquid crystal display device 41 from obliquely upward of it.

According to such a wrist watch, in a place where a light in the ultraviolet range is hardly exposed, such as indoors or the like, the external lights inputted in the liquid crystal display device 41 are transmitted through the upper polarizing plate 44, a pair of the transparent electrode PCBs 42 and 43, and the lower polarizing plate 45. Then, the rear surface side of the liquid crystal display device 41 can be illuminated by the transmitted external lights. Thereby, information, such as time or the like, can be displayed on the liquid crystal display device 41. Further, in a place where the external lights including a light in the ultraviolet range are exposed, such as outdoors or the like, the information, such as time or the like, displayed on the liquid crystal display device 41 can be seen by the lights other than in the ultraviolet range, that is, the lights in the visible range. Moreover, since the upper polarizing plate 44 and the lower polarizing plate 45 are ultraviolet ray transmissive, the light in the ultraviolet range included in the external lights is irradiated to the luminescent layer 15, and the luminescent layer 15 emits a colored light, so that information displayed in the liquid crystal display device 41 can be seen by making the emitted colored light the background. At this time, since the layer thickness of the luminescent layer 15 is changed in a wave shape, and a hue is caused in the luminescent color in accordance with the layer thickness, a hue of the luminescent color can be represented by the luminescent layer 15. Thereby, the one having a high decoration effect can be obtained.

Further, in this wrist watch, when an ultraviolet ray is generated by turning on the ultraviolet ray-emitting elements 30 in a dark place where a light in the ultraviolet range is hardly exposed, as the same as described above, since the upper polarizing plate 44 and the lower polarizing plate 45 are ultraviolet ray transmissive, the light in the ultraviolet range transmits through the upper polarizing plate 44, a pair of the transparent electrode PCBs 42 and 43, and the lower polarizing plate 45, and emitted to the luminescent layer 15. Then, the luminescent layer 15 emits a colored light by reacting to the light in the ultraviolet range. Therefore, the luminescent layer 15 can compulsorily emit a light, and thereby, it is possible to emit lights freely from the luminescent layers 15 in a desired place. Since the luminescent layer 15 functions as a backlight, information displayed in the liquid crystal display device 41 can be seen by the emitted colored light of the luminescent layer 15 even though it is a dark place where a light in the ultraviolet range is hardly exposed.

Thus, according to the wrist watch, the ultraviolet ray-emitting elements 30 are provided in the blind member 12 disposed between the liquid crystal display device 41 and the watch glass 3 by corresponding to the peripheral portion of the watch glass 3. Therefore, as the same as the fourth embodiment, the ultraviolet ray-emitting elements 30 do not obstruct the display in the liquid crystal display device 41, and moreover, the ultraviolet ray-emitting elements 30 can be protected by the blind member 12 so as not to be broken by receiving a shock or the like. Further, an ultraviolet ray can be irradiated well between the liquid crystal display device 41 and the watch glass 3 from the ultraviolet ray-emitting elements 30. Thereby, the light in the ultraviolet range can be irradiated to the luminescent layer 15, so that the luminescent layer 15 can emit a light well.

In addition, in the above-described fifth embodiment, although the ultraviolet ray-emitting elements 30 are provided in two portions, which are the twelve o'clock side and the six o'clock side of the blind member 12, it is not limited to this. For example, the ultraviolet ray-emitting elements 30 may be provided in three or more portions at equivalent intervals. Further, it is not necessary to dispose the ultraviolet ray-emitting elements 30 always in the upper portion of the blind member 12. As in the modified example of the fourth embodiment shown in FIG. 18A, the ultraviolet ray-emitting elements 30 may be disposed in a concave portion 32 provided in the transparent blind member 12, and the ultraviolet ray may be irradiated to the upper surface side of the liquid crystal display device 41 through this blind member 12. Further, as in the modified example of the fourth embodiment shown in FIG. 18B, the ultraviolet ray-emitting elements 30 may be disposed in a space portion 33 between the blind member 12 and the inner surface of the wrist watch case 1, and the ultraviolet ray may be irradiated to the upper surface side of the liquid crystal display device 41 through a space S between the blind member 12 and the liquid crystal display device 41. Even though it has such a structure, not only the same operation and effect as in the fifth embodiment can be obtained, but also the ultraviolet ray-emitting elements 30 can be protected certainly by each blind member 12, particularly.

Further, in the above-described fifth embodiment, although the layer thickness of the luminescent layer 15 is changed in a wave shape, it is not limited to this. For example, as shown in the second embodiment, it may be a luminescent layer 20 in which a plurality of luminescent films 21 to 23 are laminated, or as shown in the third embodiment, it may be a luminescent layer 25 in which dot-like luminescent portions 26 are arranged in dot-like. In this case, as the same as the modified example of the first embodiment shown in FIG. 11, phosphorescent materials 17 may also be mixed in the luminescent layers 15, 20 and 25, and it may have an afterglow function by these phosphorescent materials 17 in each luminescent layer 15, 20 and 25. Thereby, time interval of the ultraviolet ray-emitting elements 30 for emitting lights in a constant interval can be made long, and reduction of power consumption can be attempted.

Further, in the above-described fifth embodiment and its modified examples, although the luminescent layers 15, 20 and 25 are provided on the lower surface of the lower polarization plate 45 of the liquid crystal display device 41, it is not limited to this. The luminescent layers 15, 20 and 25 may be provided on the upper surface of the liquid crystal display device 41. In this case, the luminescent layers 15, 20 and 25 may be provided partially to the portions not to obstruct the information, such as time or the like, displayed in the liquid crystal display device 41.

Moreover, in the above-described fifth embodiment, although the luminescent layers 15, 20 and 25 are provided on the liquid crystal display device 41, it is not limited to this. The luminescent layers 15, 20 and 25 may be provided on each timepiece parts, such as bezels 2, a the watch glass 3, the blind member 12, watch bands 9 and the like, as the same as the first embodiment and its modified examples.

[Sixth Embodiment]

Next, a sixth embodiment in which the present invention is applied to a wrist watch will be explained with reference to FIG. 21. In this case, the same reference numerals are attached to the same elements as the fifth embodiment shown in FIG. 17 and each of its modified examples in order to explain the sixth embodiment.

The wrist watch has a structure that a watch module 40 comprises a transmissive liquid crystal display device 50 and an ultraviolet ray-emitting device 51 is disposed under the liquid crystal display device 50. The other structures of the wrist watch is approximately the same as those in the fifth embodiment.

That is, as the same as in the fifth embodiment, in the liquid crystal display device 50, a liquid crystal (not shown) is enclosed between a pair of transparent electrode printed circuit boards (PCBs) 42 and 43 which are disposed up and down. An upper polarizing plate 44 is provided on the upper surface of the electrode PCB 42 in the upper side, and a lower polarizing plate 45 is provided on the lower surface of the electrode PCB 43 in the lower side. Then, a transparent luminescent layer 15 is provided on the whole lower surface of the lower polarizing plate 45. In this case, as the same as the first embodiment, the luminescent layer 15 emits a colored light by reacting to an ultraviolet ray, and its layer thickness is changed in a wave shape.

Further, the ultraviolet ray-emitting device 51 comprises a diffuser 52 corresponding to the lower surface of the liquid crystal display device 50, and an ultraviolet ray-emitting element 30 disposed under the diffuser 52. An ultraviolet ray caused by the ultraviolet ray-emitting element 30 is diffused in the diffuser 52 and irradiated approximately uniformly to the luminescent layer 15 on the lower surface of the liquid crystal display device 50.

According to such a wrist watch, in a place where a light in the ultraviolet range is exposed, such as outdoors or the like, the luminescent layer 15 provided on the lower surface of the liquid crystal display device 50 emits a colored light and functions as a backlight, so that information displayed in the liquid crystal display device 50 can be seen by making the emitted colored light the background. Further, in a dark place where a light in the ultraviolet range is hardly exposed, such as indoors or the like, when an ultraviolet ray is generated by turning on the ultraviolet ray-emitting element 30 in the ultraviolet ray-emitting device 51, the ultraviolet ray is diffused in the diffuser 52 and irradiated approximately uniformly to the luminescent layer 15 on the lower surface of the liquid crystal display device 50. Thereby, the luminescent layer 15 reacts to the irradiated ultraviolet ray and emits a colored light, so that the luminescent layer 15 functions as a backlight even in a dark place, and information displayed in the liquid crystal display device 50 can be seen by making the emitted colored light the background.

Thus, in this wrist watch, since the luminescent layer 15 can emit compulsorily a light by turning on the ultraviolet ray-emitting element 30 in the ultraviolet ray-emitting device 51, the information displayed in the liquid crystal display device 50 can be seen by making the luminescent layer 15 emit a light freely in a desired place. Further, when the luminescent layer 15 emits a light, since the layer thickness of the luminescent layer 15 is changed in a wave shape, and a hue is caused in a luminescent color in accordance with its layer thickness, the hue of the luminescent color can be represented by the luminescent layer 15. Thereby, the one having high decoration effect can be obtained.

In addition, although the ultraviolet ray-emitting device 51 in the above-described sixth embodiment has a structure that the ultraviolet ray-emitting element 30 is provided under the diffuser 52, it is not limited to this. A light guiding plate may be disposed on the lower surface of the liquid crystal display device 50, and the ultraviolet ray-emitting element 30 may be disposed in the outer peripheral portion of the light guiding plate. Then, an ultraviolet ray from the ultraviolet ray-emitting element 30 may be guided by the light guiding plate and irradiated approximately uniformly to the lower surface of the liquid crystal display device 50 from the upper surface of the light guiding plate.

Further, in the above-described sixth embodiment, although the luminescent layer 15 is provided on the whole lower surface of the liquid crystal display device 50, it is not limited to this. For example, the luminescent layer 15 may be provided partially in a portion not to obstruct information, such as time or the like, displayed in the liquid crystal display device 50. Further, the luminescent layer 15 may be provided on the upper surface of the liquid crystal display device 50 if the wrist watch has a structure comprising a backlight device of the liquid crystal display device 50 besides the ultraviolet ray-emitting device 51.

Moreover, in the above-described sixth embodiment, although the layer thickness of the luminescent layer 15 is changed in a wave shape, it is not limited to this. For example, as shown in the second embodiment, it may be a luminescent layer 20 in which a plurality of luminescent films 21 to 23 are laminated, or as shown in the third embodiment, it may be a luminescent layer 25 in which dot-like luminescent portions 26 are arranged in dot-like. In this case, as the same as the modified example of the first embodiment shown in FIG. 11, phosphorescent materials 17 may also be mixed in the luminescent layers 15, 20 and 25, and it may have an afterglow function by these phosphorescent materials 17 in each luminescent layer 15, 20 and 25. Thereby, time interval of the ultraviolet ray-emitting element 30 for emitting lights in a constant interval can be made long, and reduction of power consumption can be attempted.

Further, in the above-described fourth to sixth embodiment and those modified examples, a light in the ultraviolet range included in an external light is inputted via the watch glass 3. However, in order to prevent the light from being inputted, an ultraviolet ray-reflecting film for reflecting the light in the ultraviolet range may be provided on the upper surface of the watch glass 3. Thereby, since the ultraviolet ray-reflecting film on the watch glass 3 reflects the light in the ultraviolet range from the outside, each luminescent layer 15, 20 and 25 in the wrist watch case 1 does not emit a light by reacting to the external light. The luminescent layers 15, 20 and 25 can emit colored lights by reacting to the ultraviolet ray only from the ultraviolet ray-emitting element 30, and moreover, the ultraviolet ray-reflecting film reflects the ultraviolet ray from the ultraviolet ray-emitting element 30 in the wrist watch case 1. Therefore, the ultraviolet ray can be irradiated efficiently to the luminescent layers 15, 20 and 25.

[Seventh Embodiment]

Next, a seventh embodiment in which the present invention is applied to a portable telephone will be explained with reference to FIGS. 22 and 23. In this case, the same reference numerals are also attached to the same elements as the fifth embodiment shown in FIG. 20 and each of its modified examples in order to explain the seventh embodiment.

Figure 22:
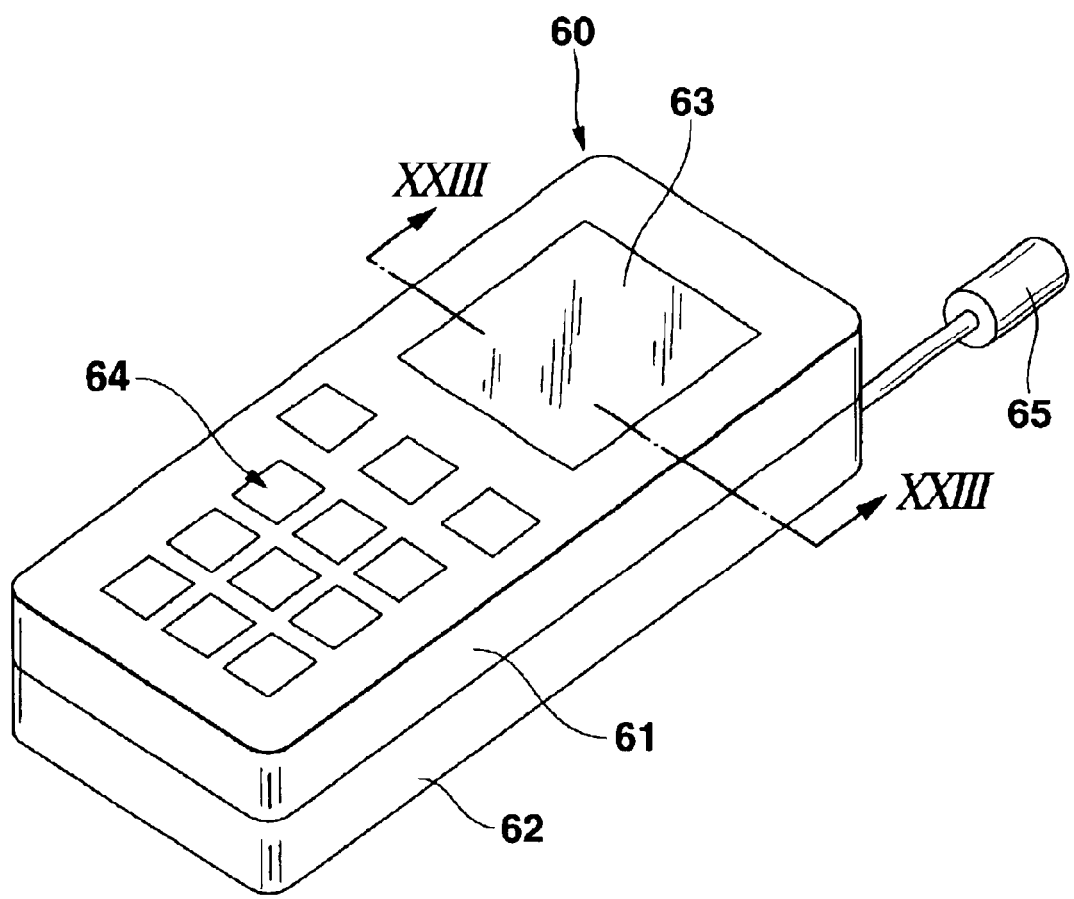
FIG. 22 is a perspective view showing an appearance of a portable telephone to which a seventh embodiment according to the present invention is applied.

FIG. 22 is a perspective view showing an appearance of the portable telephone. FIG. 23 is an enlarged cross-sectional view taken on line XXIII—XXIII in FIG. 22. As shown in FIG. 22, the portable telephone comprises an apparatus case 60 made of synthetic resign, and the apparatus case 60 has a structure that an upper case 61 is connected to a lower case 62.

On the upper surface of the apparatus case 60, that is, the upper surface of the upper case 61, a protective glass 63 is mounted on an opening portion provided in the upper portion side, and various key buttons 64 which are necessary for a telephone function are provided. Further, on the side surface in the upper portion side of the apparatus case 60, an antenna 65 is attached. The antenna 65 can be pulled out and pushed into the apparatus case 60. Moreover, as shown in FIG. 23, in the inside of the apparatus case 60, a module 66 for a telephone is contained. The module 66 comprises various parts that are necessary for a telephone function, such as a liquid crystal display device 41 and the like. The liquid crystal display device 41 has the same structure as that of the fifth embodiment shown in FIG. 20. It is disposed by corresponding to the lower side of the protective glass 63 through a blind member 67, which is a frame-like member or a frame-like portion.

Figure 23:
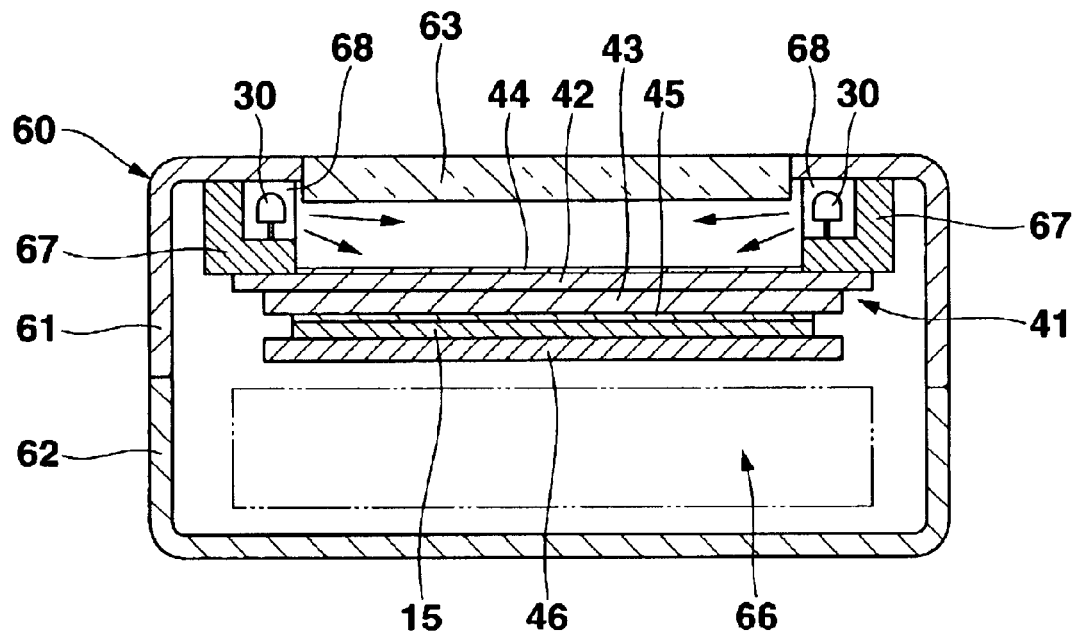
FIG. 23 is an enlarged cross sectional view taken on XXIII—XXIII in FIG. 22.

That is, as shown in FIG. 23, polarization plates 44 and 45 are provided on the upper and lower surfaces of a pair of transparent PCBs 42 and 43, respectively. A luminescent layer 15 which emits a colored light by reacting to a light in the ultraviolet range is provided on the whole lower surface of the lower polarization plate 45. Then, a reflector 46 is provided on the lower surface of the luminescent layer 15. Thus, the liquid crystal display device 41 is formed. The layer thickness of the luminescent layer 15 is changed in a wave shape, as the same as the first embodiment. The blind member 67 has a cushion function, and is provided on the inner surface of the apparatus case 60 in a state being in contact with the upper surface of the peripheral portion of the liquid crystal display device 41. In the blind member 67, concave portions 68 are provided by facing each other. In these concave portions 68, ultraviolet ray-emitting elements 30 for generating ultraviolet ray are disposed, respectively. The ultraviolet ray-emitting elements 30 irradiate the generated an ultraviolet ray from obliquely upward to the upper surface of the liquid crystal display device 41.

According to such a portable telephone, in a place where a light in the ultraviolet range is hardly exposed, such as indoors or the like, the external lights inputted in the liquid crystal display device 41 are transmitted through the upper polarizing plate 44, a pair of the transparent electrode PCBs 42 and 43, and the lower polarizing plate 45. Then, the rear surface side of the liquid crystal display device 41 can be illuminated by the transmitted external lights. Thereby, information, such as time or the like, can be displayed on the liquid crystal display device 41. Further, in a place where a light in the ultraviolet range is exposed, such as outdoors or the like, the luminescent layer 15 provided on the lower surface of the liquid crystal display device 41 emits a colored light, so that information displayed in the liquid crystal display device 41 can be seen by making the emitted colored light the background. Thus, when the luminescent layer 15 emits a light, since the layer thickness of the luminescent layer 15 is changed in a wave shape, and a hue is caused in the luminescent color in accordance with the layer thickness, a hue of the luminescent color can be represented by the luminescent layer 15. Thereby, the one having high decoration effect can be obtained.

Further, in this portable telephone, when an ultraviolet ray is generated by turning on the ultraviolet ray-emitting elements 30 in a dark place where a light in the ultraviolet range is hardly exposed, the luminescent layer 15 emits a colored light by reacting to the ultraviolet ray. Therefore, each luminescent layer 15 can compulsorily emit a light, so that it is possible to emit lights freely from the luminescent layers 15 in a desired place. Since the luminescent layer 15 functions as a backlight, information displayed in the liquid crystal display device 41 can be seen by the emitted colored light of the luminescent layer 15.

Thus, according to the portable telephone, the ultraviolet ray-emitting elements 30 are provided in the blind member 67 disposed between the liquid crystal display device 41 and the protective glass 63 by corresponding to the peripheral portion of the protective glass 63. Therefore, as the same as the fifth embodiment, the ultraviolet ray-emitting elements 30 do not obstruct the display in the liquid crystal display device 41, and moreover, the ultraviolet ray-emitting elements 30 can be protected by the blind member 67 so as not to be broken by receiving a shock or the like. Further, an ultraviolet ray can be irradiated well between the liquid crystal display device 41 and the protective glass 63 from the ultraviolet ray-emitting elements 30. Thereby, the ultraviolet ray can be irradiated certainly and well to the luminescent layer 15, so that the luminescent layer 15 can emit a light sufficiently.

In addition, in the above-described seventh embodiment, although the ultraviolet ray-emitting elements 30 are provided in two facing portions of the blind member 67, it is not limited to this. The ultraviolet ray-emitting elements 30 may be provided in three or more portions at equivalent intervals. Further, it is not necessary to dispose the ultraviolet ray-emitting elements 30 always in the upper portion of the blind member 67. As in the modified example of the fifth embodiment shown in FIG. 18A, concave portions 32 may be provided in the transparent blind member 67, and the ultraviolet ray-emitting elements 30 may be disposed in the concave portions 32. Further, as in the modified example of the fifth embodiment shown in FIG. 18B, the ultraviolet ray-emitting elements 30 may be disposed in the space portion 33 between the blind member 67 and the inner surface of the apparatus case 60. Even though it has such a structure, not only the same operation and effect as in the seventh embodiment can be obtained, but also the ultraviolet ray-emitting elements 30 can be protected certainly by each blind member 67, particularly.

Further, in the above-described seventh embodiment, although the luminescent layer 15 is provided on the whole lower surface of the liquid crystal display device 41, it is not limited to this. It may be provided partially so as not to obstruct information, such as time or the like, displayed in the liquid crystal display device 41. Further, it is not necessary to provide the luminescent layer 15 on the lower surface of the liquid crystal display device 41. The luminescent layer 15 may be provided on the upper surface of the liquid crystal display device 41.

Further, in the above-described seventh embodiment, although the layer thickness of the luminescent layer 15 is changed in a wave shape, it is not limited to this. For example, as shown in the second embodiment, it may be a luminescent layer 20 in which a plurality of luminescent films 21 to 23 are laminated, or as show in the third embodiment, it may be a luminescent layer 25 in which dot-like luminescent portions 26 are arranged in dot-like. In this case, as the same as the modified example of the first embodiment shown in FIG. 11, phosphorescent materials 17 may also be mixed in the luminescent layers 15, 20 and 25, and it may have an afterglow function by these phosphorescent materials 17 in each luminescent layer 15, 20 and 25. Thereby, time interval of the ultraviolet ray-emitting elements 30 for emitting lights in a constant interval can be made long, and reduction of power consumption can be attempted.

Further, in the above-described seventh embodiment and its modified examples, although the case that the liquid crystal display device 41 is reflective is explained, it is not limited to this. A transmissive liquid crystal display device 50, which is the same as that in the sixth embodiment shown in FIG. 21, may be used. In this case, an ultraviolet ray-emitting device 51 comprising a diffuser 52 and an ultraviolet ray-emitting element 30 may be provided under the liquid crystal display device 50. Further, it is not necessary that the luminescent layers 15, 20 and 25 always emit lights by using the ultraviolet ray-emitting element 30. The luminescent layers 15, 20 and 25 may emit lights only by a light in the ultraviolet range included in an external light.

Further, although in the above-described seventh embodiment, the luminescent layers 15, 20 and 25 are provided on the liquid crystal display device 41, it is not limited to this. The luminescent layers 15, 20 and 25 may be provided on each telephone parts, such as the apparatus case 60, the protective glass 63, various key buttons 64, the antenna 65, the blind member 67 and the like.

Figure 24A:
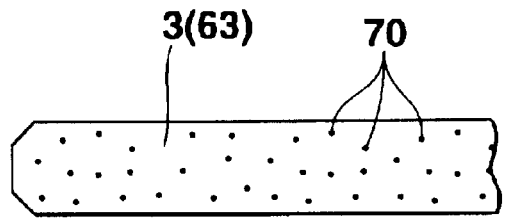
FIG. 24A is an enlarged cross sectional view showing an principal portion when luminescent materials are mixed in a watch glass or a protective glass.
Figure 24B:
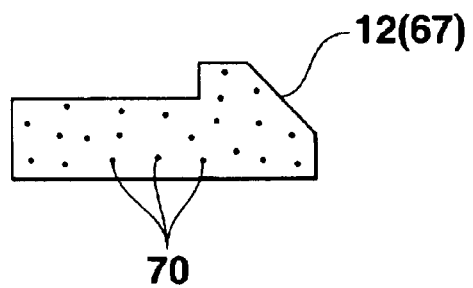
FIG. 24B is an enlarged cross sectional view showing a principal portion when luminescent materials are mixed in a transparent blind member.

Furthermore, in the above-described first to seventh embodiments and each of those modified examples, the luminescent layers 15, 20 and 25 are provided on the timepiece parts and the telephone parts. However, ultraviolet ray-emitting materials for emitting colored lights by reacting to lights in the ultraviolet range may be mixed in the parts if each of the timepiece parts and the telephone parts is a transparent member. Further, phosphorescent materials may be mixed with the ultraviolet ray-emitting materials. For example, as shown in FIG. 24A, luminescent materials 70, such as the ultraviolet ray-emitting materials, the phosphorescent materials or the like, may be mixed in the watch glass 3 or the protective glass 63. Further, as shown in FIG. 24B, if the blind members 12 and 67 are transparent, the luminescent materials 70, such as the ultraviolet ray-emitting materials, the phosphorescent materials or the like, may be mixed in the blind members 12 and 67.

Further, in the above-described first to seventh embodiments and each of those modified examples, although the case that the present invention is applied to a wrist watch or a portable telephone is explained, it is not limited to this. The present invention can be applied extensively to various electronic apparatuses, such as an electronic notebook, an electronic dictionary, a portable terminal, a personal computer, a printer and the like, to an automobile, to various apparatuses, such as an instrument or the like, or to each of those parts.

Further, in the above-described first to seventh embodiments and each of those modified examples, an example that the ultraviolet ray-emitting element 30 is provided in the frame-like member or the blind member in order to protect or cushion the ultraviolet ray-emitting element 30 is explained. However, a frame-like portion which projects into the inside may be provided at a position corresponding to the aperture portion of the watch case or the apparatus case, and the ultraviolet ray-emitting element 30 may be provided in the frame-like portion.

[Eighth Embodiment]

Next, an eighth embodiment in which the present invention is applied to a electronic wrist watch will be explained with reference to FIGS. 25 to 29. In this case, the same reference numerals are also attached to the same elements as the fourth and fifth embodiments shown in FIGS. 16 to 20 in order to explain the eighth embodiment.

Figure 25:
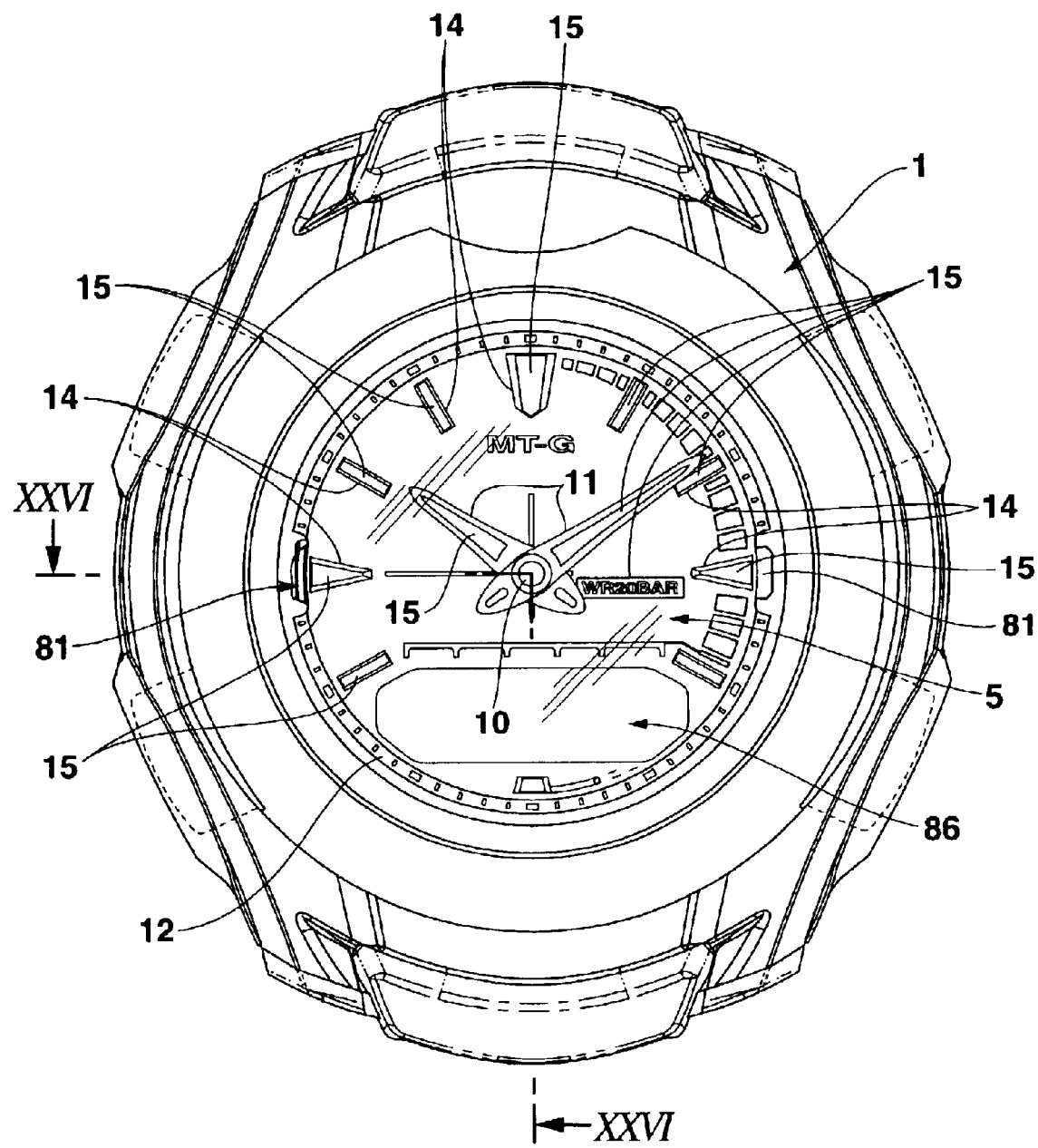
FIG. 25 is an enlarged front view showing a wrist watch to which an eighth embodiment according to the present invention is applied.

As it is obvious from a plan view shown in FIG. 25 and a cross sectional view taken on line XXVI—XXVI in FIG. 25, the electronic wrist watch contains a watch module 8 comprising both an analog function having hands and a digital function having a time display portion by a liquid crystal in a wrist watch case 1. Ultraviolet ray-emitting elements 81 are provided in the wrist watch case 1, and an ultraviolet ray-reflecting film 82 is provided on the lower surface of a watch glass 3, corresponding to an aperture portion mounted on the wrist watch case 1. The other structures of the electronic wrist watch is approximately the same as those of the fourth and fifth embodiments.

In this case, bezels 2 are provided in the outer peripheral portion of the wrist watch case 1 so as to cover the upper portion of the wrist watch case 1. A metal, such as a stainless steel or the like, ring 2a is provided between each bezel 2 and the upper portion of the wrist watch case 1. A bezel ring 2b made of metal, such as a stainless steel or the like, is attached to the outer peripheral portion of the bezels 2. Further, the watch glass 3 is mounted on the upper portion of the wrist watch case 1 via a packing 4. A rear cover 7 is attached to the lower surface of the wrist watch case 1 via a waterproof ring 8.

The watch module 80 comprises a housing 83 having the analog function and the digital function. The housing 83 is contained in a reinforcement frame 84 made of metal via a blind member 12, and is contained in the wrist watch case 1 in this state.

The analog function of the watch module 80 is as the same as that in the fourth embodiment. A hand shaft 10 is projected to the upward of a dial 5, and hands 11, such as an hour hand, a minute hand and the like, are attached to the projected hand shaft 10 so as to be moved. In this case, the dial 5 is a circular plate. A through hole 13 in which the hand shaft 10 is inserted is provided at the central portion of the dial 5. Time indices 14 and an opening portion 85 for a display are provided in the outer periphery of the upper surface of the dial 5. Further, luminescent layers 15 are provided on predetermined points (mark portions) in the upper surface of the dial 5, on the upper surface of the dial 5, on the upper surface of the hands 11, and on the surface of the blind member 12, respectively.

Figure 27:
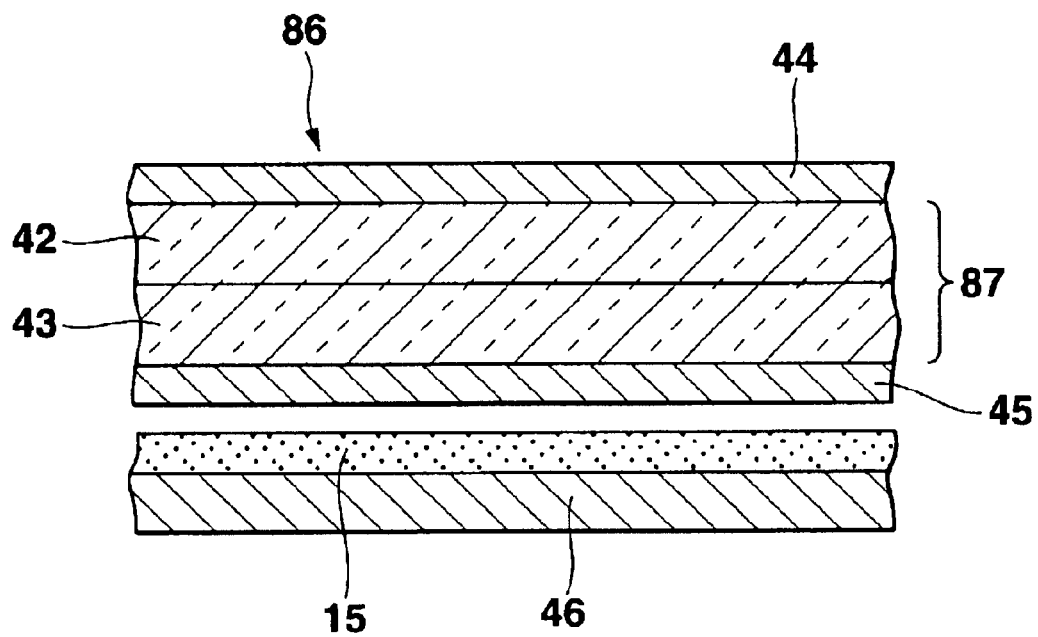
FIG. 27 is an enlarged cross sectional view showing a dismantled liquid crystal device in FIG. 26.

Further, the digital function of the watch module 80 comprises a reflective liquid crystal display device 86 for displaying information, such as time or the like. The liquid crystal display device 86 is disposed by corresponding to the lower side of the opening portion 85 for a display. As shown in FIG. 27, in the liquid crystal display device 86, an upper polarizing plate 44 for transmitting also a light in the ultraviolet range is provided on the upper surface of a liquid crystal cell 87 having a pair of transparent electrode PCBs 42 and 43 which are disposed up and down and between which a liquid crystal (not shown) is enclosed. A lower polarizing plate 45 for transmitting also a light in the ultraviolet range is provided on the lower surface of the liquid crystal cell 87 of the liquid crystal display device 86. A reflector 46 is provided in the lower side of the lower polarizing plate 45, and the luminescent layer 15 is provided on the upper surface of the reflector 46. Thus, the liquid crystal display device 86 has the same reflective structure as that of in the fifth embodiment. In this case, as the same as the fifth embodiment, each of the polarizing plates 44 and 45 is also for transmitting at least both a light in the visible range and a light in the ultraviolet range, and has a structure such that an ultraviolet ray-cutting treatment is not performed to a usual polarizing plate.

Each ultraviolet ray-emitting element 81 comprises a light-emitting element, such as an ultraviolet light emitting diode (LED) called a black light, or the like, for emitting a near ultraviolet ray (UV-A) whose wavelength is between 365 and 400 nm, preferably between 350 and 380 nm. Each ultraviolet ray-emitting element 81 is disposed in a concave portion 31 which is a space portion provided on each upper portion in the three o'clock side and the nine o'clock side of the blind member 12 which also comprises a function as a protect member or a cushion member in the wrist watch case 1. That is, the ultraviolet ray-emitting elements 81 are located between the blind member 12 and the watch glass 3. Thereby, it is disposed in more upward than the dial 5 and the hands 11.

Further, the ultraviolet ray-emitting elements 81 comprise a pair of battery terminals 88. Each battery terminal 88 is inserted in a through hole 89 of the dial 5 through the blind member 12. Each lower end portion of each inserted battery terminal 88 contacts elastically to a pair of switch springs 90 for a connection, which are provided in a circuit board 89 in the housing 83, respectively. Thereby, the battery terminals 88 are electrically connected to the circuit board 89. That is, each switch spring 90 for connection is a plate spring bent in an L-shape. The upper portion of each switch spring 90 is bent in a reverse U-shape, and the lower end portion after it is bent in the reverse U-shape can contact elastically and movably to a surface of each battery terminal 88 of each ultraviolet ray-emitting element 81 in up-and-down direction. Therefore, even though the wrist watch case 1 receives a shock from the outside, the ultraviolet ray-emitting elements 81 is constructed so that the shock is absorbed since the battery terminals 88 contact elastically to the switch springs 90.

Figure 28:
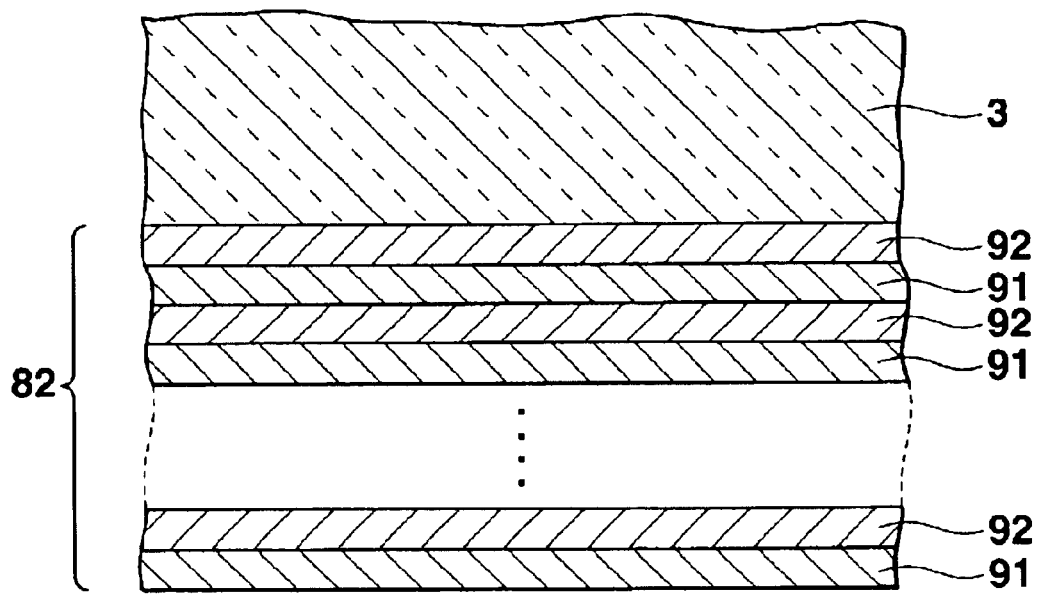
FIG. 28 is an enlarged cross sectional view showing an ultraviolet ray-reflecting film in a watch glass in FIG. 26.

The ultraviolet ray-reflecting film 82 on the lower surface of the watch glass 3 reflects a light in the ultraviolet range emitted from the ultraviolet ray-emitting elements 81 disposed in the wrist watch case 1, and transmits the lights other than the light in the ultraviolet range. It is a transparent film which also cuts off a light in the ultraviolet range among external lights inputted through the watch glass 3 and transmits the lights other than the light in the ultraviolet range. As shown in FIG. 28, the ultraviolet ray-reflecting film 82 has a structure that a first and second evaporation layers 91 and 92, which are made of different materials, are laminated alternatively. That is, in the ultraviolet ray-reflecting film 82, the first evaporation layer 91 is made of a metal, such as a titanium oxide ($TiO_2$), a titanium nitride (TiN) or the like, and the second evaporation layer 92 is made of a material, such as a silicon oxide ($SiO_2$), a silicon nitride ($Si_3N$) or the like. The second evaporation layer 92 is deposited on the lower surface of the watch glass 3 by evaporation. Then, the first evaporation layer 91 is deposited on the lower surface of the second evaporation layer 92 by evaporation. The second evaporation layer 92 is deposited again on the lower surface of the first evaporation layer 91. The ultraviolet ray-reflecting film 81 has a structure that about 22 layers of the first and second evaporation layers 91 and 92 are laminated in total by repeating consecutively this depositing operation.

In this case, when the first evaporation layer 91 is formed by the titanium oxide ($TiO_2$) and the second evaporation layer 92 is formed by the silicon oxide ($SiO_2$), the film strength is strong, and the first evaporation layer 91 of the titanium oxide is strong to an expansion and contraction stress, and the second evaporation layer 92 of the silicon oxide is strong to a compressive stress. Therefore, the strength to a crack becomes extremely strong by these synergistic effects, and cracking is prevented from being generated by deviation of stresses in the film. Further, the number of lamination of the first and second evaporation layers 91 and 92 is about 18 layers to 25 layers, preferably 22 layers. Further, the thickness of the whole ultraviolet ray-reflecting film 82 is about 1.075 μm, and the average value of each thickness of the first and second evaporation layer 91 and 92 is about 0.049 μm, which is formed thin.

Such an ultraviolet ray-reflecting film 82 reflects 70 to 90% of a light in the ultraviolet range emitted from the ultraviolet ray-emitting elements 81, and cuts off not less than 90% of the light with a wavelength not more than 300 nm among the external lights in the ultraviolet range inputted through the watch glass 3. Preferably, the ultraviolet ray-reflecting film 82 cuts off about 98% of the light with a wavelength not more than 400 nm. Further, the watch glass 3 in which the ultraviolet ray-reflecting film 82 is formed has not less than 92% of a transmittance of a light other than in the ultraviolet range inputted perpendicularly to the watch glass 3, for example, a light in the visible range (a wavelength in a range of 440 nm to 720 nm). The average value of the transmittance is not less than 93.5%, which is high. It is constructed so that the transmittance becomes high compared with the case that the ultraviolet ray-reflecting film 82 is not provided.

On the other hand, as the same as the first embodiment, each luminescent layer 15 provided on the reflectors 46 of the dial 5, the time indices 14, the hands 11, the blind member 12, and the liquid crystal display device 86 emits a colored light in the visible range by reacting to a light in the ultraviolet range, and is in a transparent state when a light in the ultraviolet range is not irradiated. That is, an electron shifts from a ground state to a high energy state such that an additive included in a pigment of an ink absorbs the energy of the light in the ultraviolet range, and then the electron returns to a stable energy level. Thus, the luminescent layers 15 emit lights. Each luminescent color (luminescent wavelength) is the wavelength given from the additive, so that it differs according to the additive. Therefore, the luminescent color of each luminescent layer 15 is based on blue, green (yellow) and red, and there are ten to thirteen kinds of color variations. In this case, the luminescent color of each luminescent layer 15 on each reflector 46 of the dial 5, the time indices 14, the hands 11, the blind member 12, and the liquid crystal display device 86 may all be the same color. However, it is desired that at least the dial 5 and the hands 11 emit with different colors in order to recognize the time easily.

In this case, among the luminescent layers 15, particularly each luminescent layer 15 provided on the time indices 14 and the blind member 12 is constructed so that its luminescent amount increases gradually as it keeps away from the corresponding ultraviolet ray-emitting element 81. For example, the luminescent amount of each luminescent layer 15 of the time indices 14 is made different by shortening gradually the wavelength of the emitting light as each luminescent layer 15 keeps away from each ultraviolet ray-emitting element 81. That is, when the irradiating amount of the light in the ultraviolet range is constant, the longer the wavelength of the light emitted from the luminescent layer 15 is, the smaller the luminescent amount is, and the shorter the wavelength is, the larger the luminescent amount is. Thereby, the luminescent color of each luminescent layer 15 in the vicinity of each ultraviolet ray-emitting element 81 is similar to red whose wavelength is long, and as the luminescent layer 15 keeps away from the ultraviolet ray-emitting element 81, the luminescent color of each luminescent layer becomes in order of similar to blue from similar to green such that the wavelength becomes short gradually.

Figure 29:
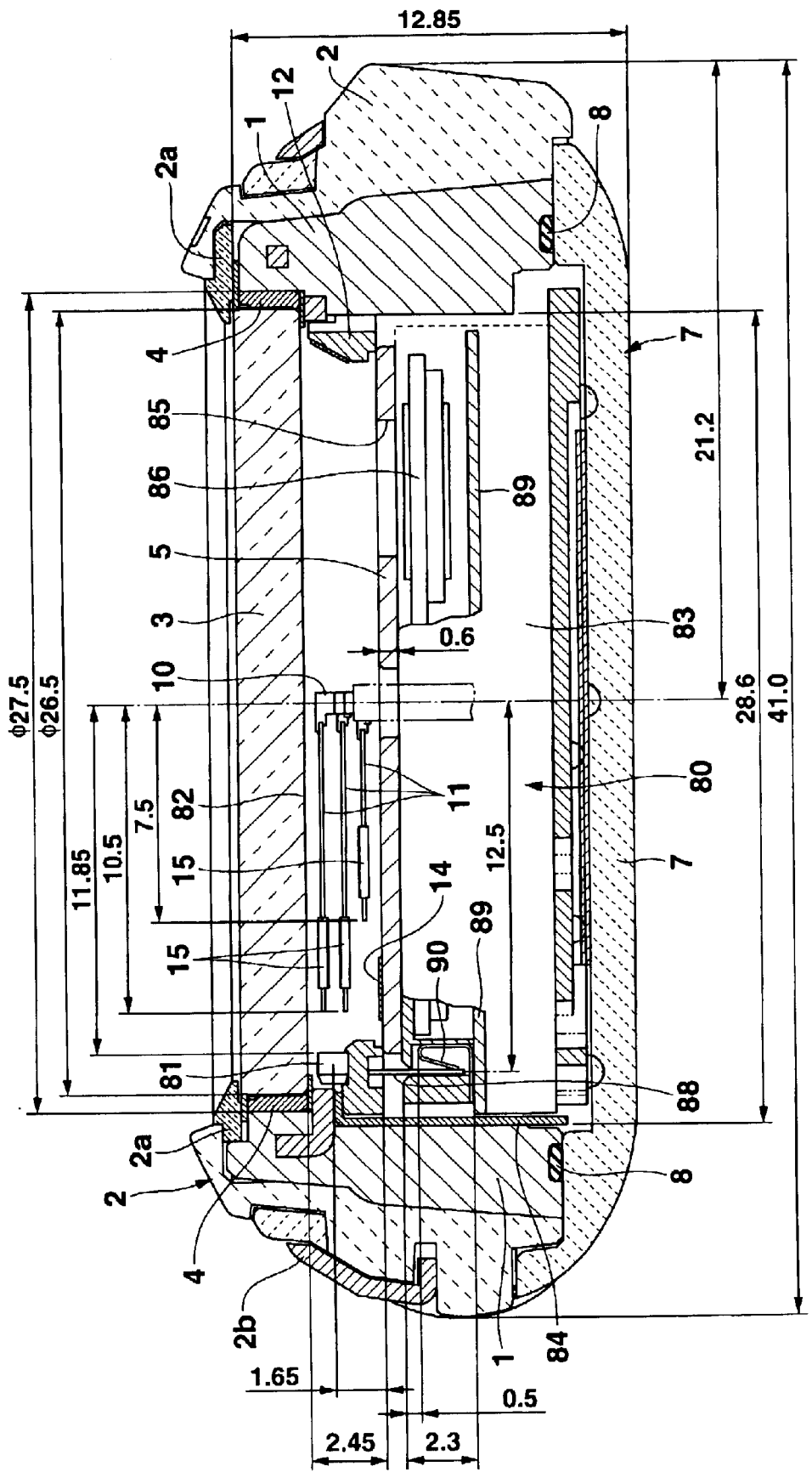
FIG. 29 is a cross sectional view showing a dimension of each portion in FIG. 26.

Incidentally, the electronic wrist watch is formed in a dimension as shown in FIG. 29. That is, the outline dimension of the wrist watch case 1 is approximately 41.0 mm, the width of the inside is approximately 28.6 mm. The inside diameter of the upper portion of the wrist watch case 1 is approximately 27.5 mm. The outer diameter of the watch glass 3 is approximately 26.5 mm, and the thickness from the upper surface of the watch glass 3 to the lower surface of the rear cover 7 is approximately 12.8 mm. The distance between the lower surface of the watch glass 3 and the upper surface of the dial 5 is approximately 2.45 mm. The thickness of the dial is approximately 0.6 mm, and the thickness of the liquid crystal display device 86, that is, the distance between the lower surface of the dial 5 and the circuit board 89 in the housing 83 is approximately 2.3 mm. Further, the distance between the outer side surface of the wrist watch case 1 and the center of the hand shaft 10 is approximately 21.2 mm. In the hands 11, the length of the hour hand is approximately 7.5 mm, and each length of the minute hand and the second hand is approximately 10.5 mm. The distance between the center of the hand shaft 10 and each ultraviolet ray-emitting element 81 is approximately 11.85 mm, the height from the luminescent central portion of each ultraviolet ray-emitting element 81 to the dial 5 is approximately 1.65 mm. The clearance from the lower surface of the dial 5 to the upper end portion of each switch spring 90 is approximately 0.5 mm. In addition, such a dimension is almost the same in the first to seventh embodiments and each modified example.

According to such an electronic wrist watch, in a bright place, such as outdoors or the like, since the light in the ultraviolet range among the external lights inputted through the watch glass 3 from the outside is cut off by the ultraviolet ray-reflecting film 82 provided on the watch glass 3, a harmful light particularly with a short wavelength, such as a middle ultraviolet ray (UV-B), a far ultraviolet ray (UV-C) or the like, can be prevented from being inputted in the wrist watch case 1. Thereby, the liquid crystal layer in the liquid crystal display device 86 can be prevented from being deteriorated by the ultraviolet ray. Further, the external lights other than in the ultraviolet range among the external lights inputted through the watch glass 3, for example, the lights in the visible range, is inputted in the wrist watch case 1 by transmitting through the ultraviolet ray-reflecting film 82. Therefore, time can be recognized by the inputted lights as the same as a general wrist watch.

At this time, each luminescent layer 15 provided to the reflectors 46 of the dial 5, the time indices 14, the hands 11, the blind member 12, and the liquid crystal display device 86, respectively, is in a transparent state. Therefore, the visibility of each timepiece parts of the dial 5, the time indices 14, the hands 11, the blind member 12, and the liquid crystal display device 86 is not influenced by each luminescent layer 15, so that each timepiece parts can just be seen. Therefore, the time can be recognized by the dial 5, the time indices 14, and the hands 11. Further, in the liquid crystal display device 86, a light other than in the ultraviolet range is inputted through the opening portion 85 for a display of the dial 5, and the inputted light is transmitted through the upper polarizing plate 44, the liquid crystal cell 87, and the lower polarizing plate 45. Then, the transmitted lights is transmitted through each luminescent layer 15 and reflected in the reflectors 46. Therefore, as the same as a general liquid crystal display device, information, such as time or the like, can be recognized.

Further, when the ultraviolet ray-emitting elements 81 are turned on in a dark place, such as indoors or the like, the lights in the ultraviolet range are emitted into the wrist watch case 1. The emitted lights in the ultraviolet range are irradiated to each luminescent layer 15 provided on the reflectors 46 of the dial 5, the time indices 14, the hands 11, the blind member 12, and the liquid crystal display device 86, respectively. Thereby, since each luminescent layer 15 emits a colored light as a light in the visible region by reacting to the light in the ultraviolet range. In this case, a portion of the lights emitted from the ultraviolet ray-emitting elements 81 is irradiated directly to each luminescent layer 15, and the other portion of the lights are reflected in the ultraviolet ray-reflecting film 82 provided on the lower surface of the watch glass 3 and irradiated indirectly to each luminescent layer 15. Therefore, since the lights in the ultraviolet range emitted from the ultraviolet ray-emitting elements 81 are not discharged to the outside by transmitting through the watch glass 3, the lights in the ultraviolet range emitted from the ultraviolet ray-emitting elements 81 are hardly damaged, and can be irradiated efficiently to each luminescent layer 15. Thereby, each luminescent layer 15 can emit lights sufficiently.

At this time, each luminescent layer 15 provided on the time indices 14 and the blind member 12 is constructed so that its luminescent amount increases gradually as each luminescent layer 15 keeps away from each ultraviolet ray-emitting element 81, for example, the luminescent amount is made different by shortening gradually the wavelength of the emitting light as it keeps away from each ultraviolet ray-emitting element 81. Thereby, each luminescent layer 15 in the vicinity of each ultraviolet ray-emitting element 81 emits a light similar to red whose wavelength is long, and as it keeps away from the ultraviolet ray-emitting element 81, each luminescent layer emits a light in order of similar to blue from similar to green such that the wavelength becomes short gradually. Thereby, in the luminescent layers 15 in the vicinity of the ultraviolet ray-emitting elements 81, the luminescent amount is small even though the irradiating amount of the lights in the ultraviolet range is large. Then, as the luminescent layers 15 keep away from the ultraviolet ray-emitting elements 81, the luminescent amount according to the luminescent layers 15 increases even though the irradiating amount of the lights in the ultraviolet range is small. Therefore, even though it is in the vicinity of the ultraviolet ray-emitting elements 81, or event though it is away from the ultraviolet ray-emitting elements 81, lights can be emitted in uniform brightness. Moreover, the colors of lights emitted from each luminescent layer 15 can be separated. Thereby, the one preferable in decoration and in design can be obtained.

Further, at this time, the lights in the ultraviolet range emitted from the ultraviolet ray-emitting elements 81 are inputted in the liquid crystal display device 86 through the opening portion 85 for a display of the dial 5. The lights in the ultraviolet range are transmitted through the ultraviolet ray transmissive upper polarizing plate 44, the liquid crystal cell 87, and the ultraviolet ray transmissive lower polarizing plate 45. Then, the transmitted lights are irradiated to the luminescent layers 15. Therefore, the luminescent layers 15 emit colored lights as lights in the visible range by reacting to the lights in the ultraviolet range, and the lights in the visible range works as back lights of the liquid crystal cell 87, so that the liquid crystal cell 87 can be illuminated. Thereby, information, such as time or the like, can be recognized. In this case, the upper polarizing plate 44 and the lower polarizing plate 45 of the liquid crystal display device 86 are ultraviolet ray transmissive. Therefore, the lights in the ultraviolet range are transmitted and irradiated through the liquid crystal layer in the liquid crystal cell 87. However, since the luminescent time according to the ultraviolet ray-emitting elements 81 is short, the liquid crystal layer is hardly deteriorated.

Thus, according to the electronic wrist watch, since the upper polarizing plate 44 and the lower polarizing plate 45 of the liquid crystal display device 86 are ultraviolet ray transmissive, lights including the lights in the ultraviolet range are transmitted through the upper polarizing plate 44, the liquid crystal cell 87, and the lower polarizing plate 45. The lights other than in the ultraviolet range, for example, the lights in the visible range, among the transmitted lights, are transmitted through the luminescent layers 45 of the reflectors 46 and reflected in the reflectors 46. Therefore, the liquid crystal cell 87 can be illuminated by the reflected lights. Further, when the lights in the ultraviolet range are irradiated to the luminescent layers 15, the luminescent layers 15 emit colored lights by reacting to the lights in the ultraviolet range. Therefore, the liquid crystal cell 87 can be illuminated by the colored lights emitted from the luminescent layers. Thereby, even though the lights inputted in the liquid crystal display device 86 are the lights other than the ultraviolet range, such as in the visible range or the like, or even though the lights are the lights in the ultraviolet range, the liquid crystal cell 87 can be illuminated well.

Further, in the electronic wrist watch, when lights are emitted from the ultraviolet ray-emitting elements 81, the lights in the ultraviolet range are emitted into the wrist watch case 1. A portion of the lights is irradiated directly to each luminescent layer 15 provided on the reflectors 46 of the dial 5, the hands 11, the blind member 12, and the liquid crystal display device 86, respectively, and the other portion of the lights are reflected in the ultraviolet ray-reflecting film 82 provided on the lower surface of the watch glass 3 and irradiated to each luminescent layer 15. Therefore, the lights in the ultraviolet range emitted from the ultraviolet ray-emitting elements 82 can be irradiated efficiently to each luminescent layer 15 without damaging the lights. Thereby, each luminescent layer 15 can emit lights sufficiently.

Moreover, in the electronic wrist watch, the ultraviolet ray-reflecting film 82 has a structure that the first and second evaporation layers 91 and 92 having different materials are laminated alternatively. Therefore, the reflectivity of the lights in the ultraviolet range or the transmittance of the lights other than the ultraviolet range can be set suitably by selecting appropriately the number of lamination of the first and second evaporation layers 91 and 92 and selecting each layer thickness of the first and second evaporation layers 91 and 92. For example, when the number of lamination of the first and second evaporation layers 91 and 92 is made large, the reflectivity of the lights in the ultraviolet range becomes high. Further, even though when the thickness of the first and second evaporated layers 91 and 92 is made thick, the reflectivity of the lights in the ultraviolet range becomes high. Therefore, the most suitable reflectivity can be obtained by combining these.

In this case, particularly, the number of lamination of the first and second evaporation layers 91 and 92 is made into 22 layers, and the whole thickness is formed so as to be 1.075 $\mu$m. Thereby, not less than 92% of the lights other than in the ultraviolet range, for example, the lights in the visible range, are transmitted, and 70 to 90% of the lights in the ultraviolet range emitted from the ultraviolet ray-emitting elements 81 are reflected. Then, not less than 90% of the lights with a wavelength not more than 300 nm among the lights in the ultraviolet range inputted through the watch glass 3 from the outside of the wrist watch case 1 are cut off, preferably about 98% of the lights with a wavelength not more than 400 nm can be cut off. Therefore, the lights in the ultraviolet range emitted from the ultraviolet ray-emitting elements 81 can be irradiated sufficiently to the luminescent layers 15. Further, the lights in the ultraviolet range from the outside can be cut almost certainly, and a harmful light in the ultraviolet range with a short wavelength, which is included in the external lights, for example, a middle ultraviolet ray (UV-B) or a far ultraviolet ray (UV-C), can be prevented from being inputted in the wrist watch case 1. Thus, deterioration of the liquid crystal layer in the liquid crystal display device 86 can be prevented. Thereby, the durability of the liquid crystal display device 86 can be improved.

In addition, in the above-described eighth embodiment, the ultraviolet ray-emitting elements 81 are disposed in concave portions 31 of the blind member 12 in a state that the watch glass 3 is close to the lower surface of the watch glass 3. Thereby, the ultraviolet ray-emitting elements 81 are disposed in the upward of the dial 5 and the hands 11. However, it is not limited to this. For example, the ultraviolet ray-emitting elements 81 may be disposed as shown in FIG. 18A or FIG. 18B. That is, in the modified embodiment shown in FIG. 18A, the blind member 12 is formed by a transparent material. The ultraviolet ray-emitting elements 81 are disposed in the inside lower portion of the transparent blind member 12. Further, in the modified embodiment shown in FIG. 18B, the ultraviolet ray-emitting elements 81 are disposed in the lower side of the blind member 12. Then, a space S is provided between the blind member 12 and the dial 5. The lights in the ultraviolet range emitted from the ultraviolet ray-emitting elements 81 are emitted through the space S to the upward of the dial 5. In either of these cases, since the ultraviolet ray-emitting elements 81 are disposed so as to be located between the dial 5 and the hands 11, the lights in the ultraviolet range are reflected in the ultraviolet ray-reflecting film 82 provided on the watch glass 3. Therefore, it has the same operation and effect as the eighth embodiment.

Further, in the above-described eighth embodiment, although the ultraviolet ray-reflecting film 82 is provided on the lower surface of the watch glass 3, it is not limited to this. It may be provided on the upper surface of the watch glass 3. Further, it is not necessary that the ultraviolet ray-reflecting film 82 has a structure in which the evaporation layers are laminated. For example, it may have a structure that an ultraviolet ray-reflecting agent for reflecting an ultraviolet ray is mixed into a resign sheet. Further, it may have a structure that an ultraviolet ray-reflecting agent for reflecting an ultraviolet ray is mixed into the watch glass. In either of these structures, the mixed amount of the ultraviolet ray-reflecting agent is regulated appropriately, and the reflectivity of the lights in the ultraviolet range and the transmittance of the lights other than the ultraviolet range are set in the most suitable state. Thereby, the same operation and effect as the eighth embodiment can be obtained.

Moreover, in the above-described eighth embodiment, the luminescent amount of the luminescent layers 15 increases gradually as they keep away from the ultraviolet ray-emitting elements 81. For example, the wavelength of the lights in the visible range emitted from the luminescent layers 15 becomes short gradually as they keep away from the ultraviolet ray-emitting elements 81. However, it is not limited to this. The layer thickness of the ultraviolet ray-emitting elements 81 may be formed thick gradually. Further, the luminescent layers 15 may be provided in dot-like as shown in FIG. 13, and the density of the dots may be made high gradually as they keep away from the ultraviolet ray-emitting elements 81. Even though it has such a structure, lights can be emitted in almost uniform brightness even though the luminescent layers 15 keep away from the ultraviolet ray-emitting elements 81.

Furthermore, in the above-described embodiment, although the case that the present invention is applied to the electronic wrist watch as an electronic apparatus is explained, it is not limited to this. For example, as the same as the seventh embodiment shown in FIGS. 22 and 23, the present invention can be applied to a portable telephone, and moreover extensively to various electronic apparatuses, such as an electronic notebook, an electronic dictionary, a portable terminal, a personal computer, a printer and the like, to an automobile, to various apparatuses, such as an instrument or the like, or to each of those parts.

As explained above, in the embodiment, as shown in FIGS. 1 to 24, an electronic apparatus comprises: an apparatus case (a watch case 1 or an apparatus case 60) having an aperture portion (a watch glass 3 or a protective glass 63); a module (a watch module 6 or 49, or a module 66), at least one portion of which is disposed in the apparatus case by corresponding to the aperture portion; a frame-like portion (a blind member 12 or 67) provided between the module and the apparatus case by corresponding to a peripheral portion of the aperture portion; an ultraviolet ray-emitting portion (an ultraviolet lamp 30) for irradiating a light in an ultraviolet range, the ultraviolet ray-emitting portion being provided in the frame-like portion; and a luminescent layer (15) for emitting a colored light by reacting to the light in the ultraviolet range irradiated from the ultraviolet ray-emitting portion, the luminescent layer being provided on at least the one portion of the module by corresponding to the aperture portion.

According to the embodiment, the ultraviolet ray-emitting portion is provided in the frame-like portion disposed between the module and the apparatus case by corresponding to the peripheral portion of the aperture portion. Therefore, the ultraviolet ray-emitting portion can be installed so as not to obstruct and not to be broken by receiving a shock or the like. Further, a light in the ultraviolet range can be irradiated well between the module and the aperture portion from the ultraviolet ray-emitting portion. Thereby, the ultraviolet ray can be irradiated certainly and well to the luminescent layer, so that the luminescent layer can emit lights sufficiently.

Further, in the embodiment, as shown in FIG. 16, the ultraviolet ray-emitting portion (the ultraviolet lamp 30) is provided in a position close to an inner surface of the aperture portion in the frame-like portion (the blind member 12). Thereby, a light in the ultraviolet range can be irradiated still better between the module and the aperture portion.

Further, in the embodiment, as shown in FIG. 18A and FIG. 18B, the frame-like portion (the blind member 12) is a frame-like member made of a transparent material, and a space portion (a concave portion 32 or a space portion 33) is provided in an inside of the frame-like member, and the ultraviolet ray-emitting portion (the ultraviolet lamp 30) is disposed in the space portion. In this case, still better than the embodiment shown in FIGS. 16 to 24, the ultraviolet ray-emitting portion can be installed so as not to obstruct and not to be broken by receiving a shock or the like.

Moreover, in the embodiment, as shown in FIG. 16, the module (the watch module 6) comprises a function for indicating a time by hands (11) and a dial (5), and the luminescent layer (15) is provided on the hands and the dial. In this case, since the luminescent layer emits a colored light by reacting to the ultraviolet ray from the ultraviolet ray-emitting portion, it is possible to recognize time easily even in a dark place.

Further, in the embodiment, as shown in FIGS. 20 to 23, the module (the watch module 40 or the module 66) comprises a function for displaying information by a liquid crystal display device (41), and the luminescent layer (15) is provided on the liquid crystal display device. In this case, since the luminescent layer emits a colored light by reacting to the ultraviolet ray from the ultraviolet ray-emitting portion, it is possible to recognize time easily even in a dark place.

Figure 21:
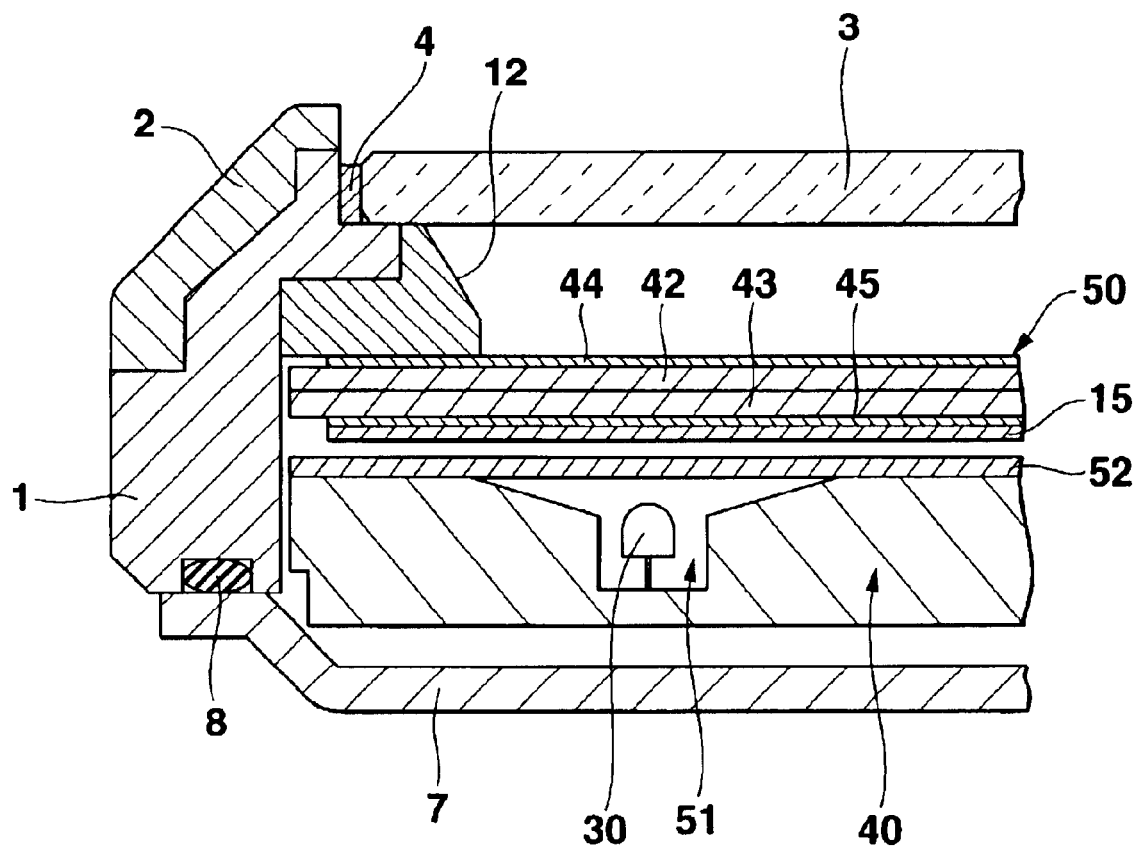
FIG. 21 is an enlarged cross sectional view showing a principal portion of an internal structure of a wrist watch to which a sixth embodiment according to the present invention is applied.

Further, in the embodiment, as shown in FIG. 21, an electronic apparatus comprises: an apparatus case (a wrist watch case 1) having an aperture portion (a watch glass 3); a liquid crystal display device (50) disposed in the apparatus case by corresponding to the aperture portion; an ultraviolet ray-emitting portion (an ultraviolet ray-emitting device 51) for emitting a light in an ultraviolet range, the ultraviolet ray-emitting portion being disposed in a rear surface side of the liquid crystal display device; and a luminescent layer (15) for emitting a colored light by reacting to the light in the ultraviolet range, the luminescent layer provided in the liquid crystal display device side.

According to the embodiment, when the ultraviolet ray-emitting portion is turned on so as to emit a light in the ultraviolet range, the luminescent layer emits a colored light by reacting to the light in the ultraviolet range. Therefore, the liquid crystal display device can be illuminated by the colored light from the luminescent layer. Thereby, a backlight function can be achieved by the luminescent layer, and the one excellent in decoration property can be obtained by the colored light emitted from the luminescent layer.

Further, in the embodiment, as shown in FIG. 11, a phosphorescent material is mixed in the luminescent layer. In this case, the phosphorescent material saves energy from the light emitted from the luminescent layer. Then, since the phosphorescent material emits a light as afterglow after ultraviolet ray-emitting portion is turned off, it can have an afterglow function, and thereby, the one having high decoration property can also be obtained. Moreover, time interval for making the ultraviolet ray-emitting portion emit lights in a constant interval can be made long, and reduction of power consumption can be attempt.

In the embodiment, as shown in FIGS. 20 to 29, a liquid crystal display device (86) comprises: a liquid crystal cell (87) made by enclosing a liquid crystal between a pair of transparent electrode printed circuit boards (42 and 43); an ultraviolet ray transmissive upper polarizing plate (44) disposed on an upper surface of the liquid crystal cell; an ultraviolet ray transmissive lower polarizing plate (45) disposed on a lower surface of the liquid crystal cell; a reflector (46) disposed on a lower side of the lower polarizing plate; and a luminescent layer (15) for emitting a colored light by reacting to a light in an ultraviolet range, the luminescent layer being provided on an upper surface of the reflector.

According to the embodiment, since the upper polarizing plate and the lower polarizing plate are ultraviolet ray transmissive, when lights including the lights in the ultraviolet range are inputted through the upper polarizing plate, those lights transmit through the upper polarizing plate, the liquid crystal cell, and the lower polarizing plate. The lights other than in the ultraviolet range, for example, the lights in the visible range, among the transmitted lights, are transmitted through the luminescent layers and reflected in the reflector. Therefore, the liquid crystal cell can be illuminated by the reflected lights. Further, when the lights in the ultraviolet range are irradiated to the luminescent layer, the luminescent layer emits colored lights by reacting to the lights in the ultraviolet range. Therefore, the liquid crystal cell can be illuminated by the colored lights emitted from the luminescent layer. Thereby, even though the lights inputted through the upper polarizing plate are the lights other than the ultraviolet range, such as the visible range or the like, or even though the lights are the lights in the ultraviolet range, the liquid crystal cell can be illuminated well.

Further, in the embodiment, as shown in FIGS. 16 to 29, an electronic apparatus comprises: an apparatus case (a wrist watch case 1 or an apparatus case 60) having an aperture portion (a watch glass 3 or a protective glass 63); a module (a watch module 6, 40 or 80, or a module 66) disposed in the apparatus case by corresponding to the aperture portion; an ultraviolet ray-emitting portion (an ultraviolet ray-emitting element 30 or 81) for emitting a first light in an ultraviolet range, the ultraviolet ray-emitting portion being disposed in the apparatus case by corresponding to a peripheral portion of the aperture portion; a luminescent layer (15) for emitting a colored light by reacting to the first light in the ultraviolet range, the luminescent layer being provided on the module; and an ultraviolet ray-reflecting film (82) for reflecting the first light in the ultraviolet range emitted from the ultraviolet ray-emitting portion and transmitting lights other than the first light in the ultraviolet range, the ultraviolet ray-reflecting film being provided on at least one of a front surface and a rear surface of the aperture portion.

According to the embodiment, when lights are emitted from the ultraviolet ray-emitting portion, the lights in the ultraviolet range are emitted into the apparatus case. A portion of the lights is irradiated directly to the luminescent layer, and the other portion of the lights are reflected in the ultraviolet ray-reflecting film of the aperture portion and irradiated to the luminescent layer. Therefore, the lights in the ultraviolet range emitted from the ultraviolet ray-emitting portion can be irradiated efficiently to the luminescent layer without damaging the lights. Thereby, luminescent layer can emit lights sufficiently.

In the embodiment, as shown in FIGS. 20 to 29, an electronic apparatus comprises: an apparatus case (a wrist watch case 1 or an apparatus case 60) having an aperture portion (a watch glass 3 or a protective glass 63); a module (a watch module 40 or 80) having a liquid crystal display device (41 or 86), at least the module being disposed in the apparatus case by corresponding to the aperture portion, the liquid crystal display device comprising: a liquid crystal cell made by enclosing a liquid crystal between a pair of transparent electrode printed circuit boards (42 and 43), a pair of ultraviolet ray transmissive polarizing plates (44 and 46) disposed on an upper surface and a lower surface of the liquid crystal cell (87), respectively, and a reflector (46) disposed on a lower side of the polarizing plate located on a lower side of the liquid crystal cell; an ultraviolet ray-emitting portion (an ultraviolet ray-emitting element 30 or 81) for emitting a first light in an ultraviolet range, the ultraviolet ray-emitting portion being disposed in the apparatus case by corresponding to a peripheral portion of the aperture; a luminescent layer (15) for emitting a colored light by reacting to the first light in the ultraviolet range, the luminescent layer being provided on the reflector of the liquid crystal display device; and an ultraviolet ray-reflecting film (82) for reflecting the first light in the ultraviolet range emitted from the ultraviolet ray-emitting portion and transmitting lights other than the first light in the ultraviolet range, the ultraviolet ray-reflecting film being provided on at least one of a front surface and a rear surface of the aperture portion.

According to the embodiment, since a pair of the polarizing plates in the liquid crystal display device are ultraviolet ray transmissive, as the same as described in the eight embodiment, even though the lights inputted in the liquid crystal display device 86 are the lights other than the ultraviolet range, such as the visible range or the like, or even though the lights are the lights in the ultraviolet range, the liquid crystal cell can be illuminated well. Further, since the ultraviolet ray-reflecting film is provided on the aperture portion of the apparatus case, as the same as the eighth embodiment, the lights in the ultraviolet range emitted from the ultraviolet ray-emitting portion can be irradiated efficiently to the luminescent layer without damaging the lights. Thereby, luminescent layer can emit lights sufficiently so as to illuminate the liquid crystal cell brightly.

Figure 26:
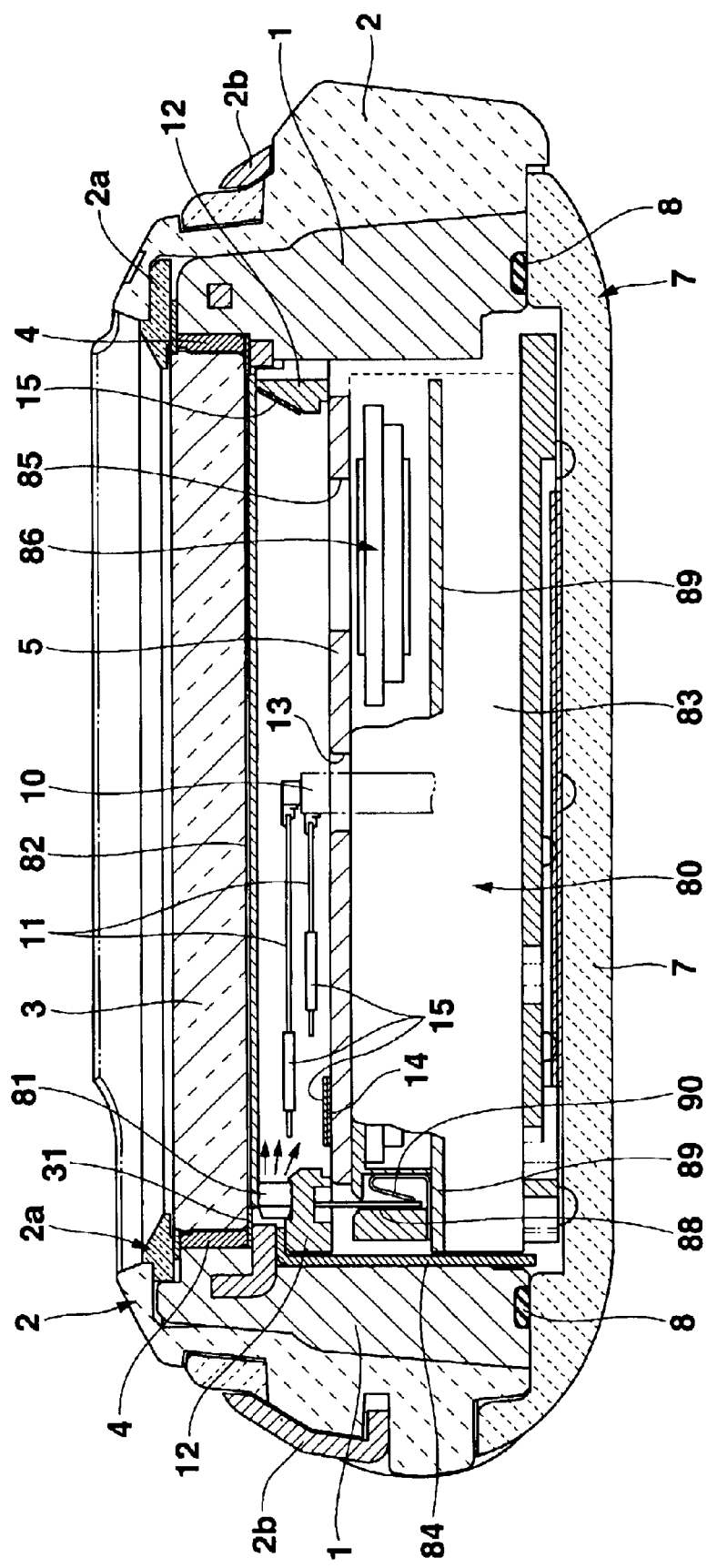
FIG. 26 is an enlarged cross sectional view taken on XXVI—XXVI in FIG. 25.

In the embodiment, as shown in FIGS. 26 and 28, the ultraviolet ray-reflecting film (82) cuts off only a second light in the ultraviolet range among external lights inputted through the aperture portion (the watch glass 3) from an outside of the apparatus case (the wrist watch 1).

According to the embodiment, it has the same operation and effect as described above. Moreover, particularly, the ultraviolet ray-reflecting film cuts off only the lights in the ultraviolet range among the external lights inputted through the aperture portion from the outside of the apparatus case. Therefore, the lights in the ultraviolet range included in the external lights are not irradiated on the luminescent layer in the apparatus case. Further, particularly, the harmful lights in the ultraviolet range with a short wavelength can be prevented from being inputted in the apparatus case. Thereby, deterioration of the liquid crystal layer in the liquid crystal display device can be prevented.

Further, in the embodiment, as shown in FIG. 28, the ultraviolet ray-reflecting film (82) has a structure that evaporation layers are laminated, the evaporation layers being thin films.

According to the embodiment, since the ultraviolet ray-reflecting film has a structure that evaporation layers are laminated, the reflectivity of the lights in the ultraviolet range and the transmittance of the lights other than the ultraviolet range can be set suitably by selecting appropriately the number of lamination of the evaporation layers and selecting the layer thickness of the evaporation layers. For example, when the number of lamination of the evaporation layers is made large, the reflectivity of the lights in the ultraviolet range becomes high. Further, even though when the thickness of the evaporated layers is made thick, the reflectivity of the lights in the ultraviolet range becomes high. Therefore, the most suitable reflectivity can be obtained by combining these.

In the embodiment, as shown in FIG. 28, the ultraviolet ray-emitting film (82) has a structure for transmitting not less than 92% of a second light other than in the ultraviolet range with a wavelength not less than 450 nm, for reflecting 70% to 90% of the first light in the ultraviolet range from the ultraviolet ray-emitting portion (the ultraviolet ray-emitting element 81), for cutting off not less than 90% of a third light with a wavelength not more than 300 nm, and for cutting off around 98% of a fourth light with a wavelength not more than 400 nm, among lights in the ultraviolet range inputted through the aperture portion (the watch glass 3) from an outside of the apparatus case (the wrist watch case 1).

According to the embodiment, since the ultraviolet ray-reflecting film reflects 70 to 90% of the lights in the ultraviolet range emitted from the ultraviolet ray-emitting portion, the lights in the ultraviolet range emitted from the ultraviolet ray-emitting portion can be reflected efficiently and irradiated sufficiently to the luminescent layer. Further, since not less than 90% of the lights with a wavelength not more than 300 nm among the lights in the ultraviolet range from the outside are cut off, preferably around 98% of the lights with a wavelength not more than 400 nm are cut off, the lights in the ultraviolet range from the outside can be cut almost certainly. Moreover, since not less than 92% of the lights with a wavelength not less than 450 nm other than in the ultraviolet range are transmitted, the inside of the apparatus case can be illuminated well by the lights other than in the ultraviolet range transmitted through the ultraviolet ray-reflecting film.

Figure 13:
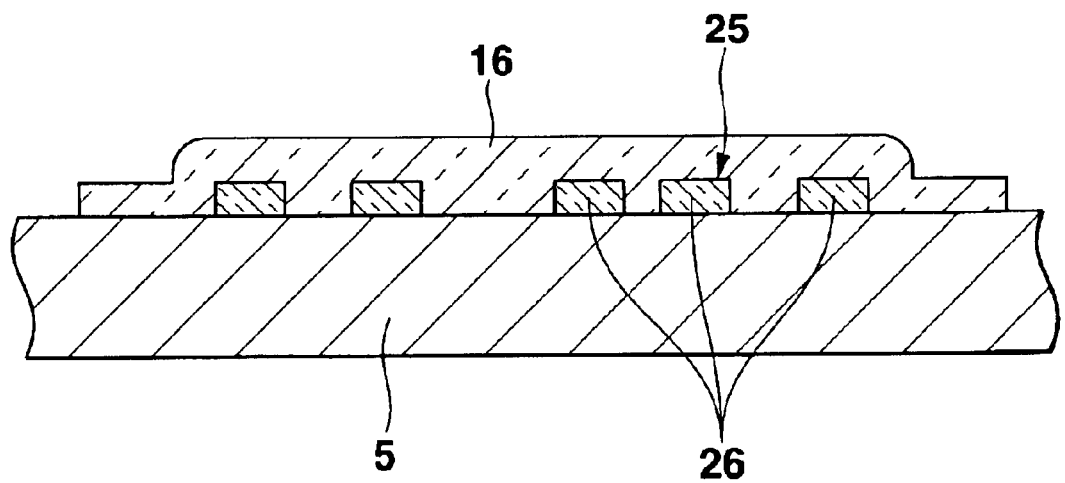
FIG. 13 is an enlarged cross sectional view showing a principal portion when a luminescent layer in which a dot-like luminescent portion is arranged in dot-like in a wrist watch to which a third embodiment according to the present invention is applied.
Figure 14:
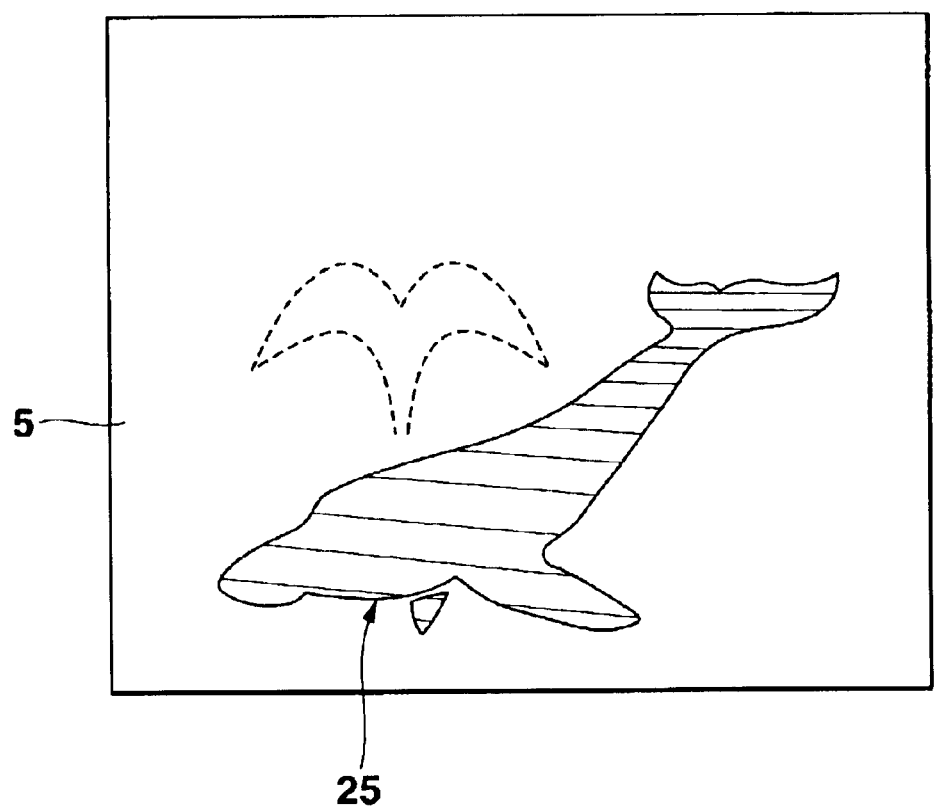
FIG. 14 is a plan view showing a state that a light in the ultraviolet range is irradiated to the luminescent on the dial in FIG. 13.

Further, in the embodiment, as shown in FIG. 13 and FIG. 25, the luminescent layer (15) is constructed so that a luminescent amount increases gradually as the luminescent layer keeps away from the ultraviolet ray-emitting portion (the ultraviolet ray-emitting element 81).

According to the embodiment, even though the irradiating amount of the lights in the ultraviolet range is large to the luminescent layer in the vicinity of the ultraviolet ray-emitting portion, the luminescent amount of the luminescent layer is small, and even though the irradiating amount of the lights in the ultraviolet range is small as it keeps away from the ultraviolet ray-emitting portion, the luminescent amount of the luminescent layer becomes large. Therefore, even though it is in the vicinity of the ultraviolet ray-emitting portion or away from the ultraviolet ray-emitting portion, lights can be emitted in almost uniform brightness.

In the embodiment, as shown in FIG. 25, the luminescent layer (15) is constructed so that a wavelength of an emitting light in a visible range becomes short gradually as the luminescent layer keeps away from the ultraviolet ray-emitting portion (the ultraviolet ray-emitting element 81).

According to the embodiment, the luminescent layer in the vicinity of ultraviolet ray-emitting portion emits a light in the visible range similar to red whose wavelength is long, and as it keeps away from the ultraviolet ray-emitting portion, the luminescent layer emits a light in the visible range in order of similar to blue from similar to green such that the wavelength becomes short gradually. Thereby, even though it is in the vicinity of the ultraviolet ray-emitting portion or away from the ultraviolet ray-emitting portion, lights can be emitted in almost uniform brightness. Moreover, the colors of lights emitted from each luminescent layer 15 can be separated. Thereby, one excellent in decoration property can be obtained.

What is claimed is:

1. An electronic apparatus comprising:

an apparatus case having an aperture portion;

a module disposed in the apparatus case by corresponding to the aperture portion;

an ultraviolet ray-emitting portion for emitting a first light in an ultraviolet range, the ultraviolet ray-emitting portion being disposed in the apparatus case by corresponding to a peripheral portion of the aperture portion;

a luminescent layer for emitting a colored light by reacting to the first light in the ultraviolet range, the luminescent layer being provided on the module; and an ultraviolet ray-reflecting film for reflecting the first light in the ultraviolet range emitted from the ultraviolet ray-emitting portion and transmitting lights other than the first light in the ultraviolet range, the ultraviolet ray-reflecting film being provided on at least one of a front surface and a rear surface of the aperture portion, wherein the ultraviolet ray-emitting film has a structure for transmitting not less than 92% of a second light other than in the ultraviolet range with a wavelength not less than 450 nm, for reflecting 70% to 90% of the first light in the ultraviolet range from the ultraviolet ray-emitting portion, for cutting off not less than 90% of a light with a wavelength not more than 300 nm, and for cutting off around 98% of a fourth light with a wavelength not more than 400 nm, among lights in the ultraviolet range inputted through the aperture portion from an outside of the apparatus case.

2. The electronic apparatus as claimed in claim 1, wherein the ultraviolet ray-reflecting film cuts off only a second light in the ultraviolet range among external lights inputted through the aperture portion from an outside of the apparatus case.

3. The electronic apparatus as claimed in claim 1, wherein the ultraviolet ray-reflecting film has a structure that evaporation layers are laminated, the evaporation layers being thin films.

4. The electronic apparatus as claimed in claim 1, wherein the luminescent layer is constructed so that a luminescent amount increases gradually as the luminescent layer keeps away from the ultraviolet ray-emitting portion.

5. A watch comprising:
   a watch case having a transparent protective member mounted on an upper portion thereof;
   a watch module disposed on the watch case;
   an ultraviolet ray-emitting element which is provided at an upper portion of the frame-like member, for irradiating a light in an ultraviolet range;
   a dial provided at an upper position of the watch module;
   a hand attached to an upper portion of a hand shaft projected from a center of the dial; and
   a luminescent layer for emitting a colored light by reacting to the light in the ultraviolet range irradiated from the ultraviolet ray-emitting element, the luminescent layer being provided on an upper surface of the hand,
   wherein a pair concave portions having openings toward a center of the frame-like member are formed in an upper portion of the frame-like member at positions opposite to each other, and the positions of the concave portions are higher than that of the hands, and the ultraviolet ray-emitting element is disposed in the pair of concave portions.

6. A watch as claimed in claim 5, wherein the pair of concave portions are disposed in a twelve o'clock side and a six o'clock side.

7. A watch as claimed in claim 5, wherein another luminescent layer is provided on an upper surface of the dial.

* * * * *

UNITED STATES PATENT AND TRADEMARK OFFICE
CERTIFICATE OF CORRECTION

PATENT NO. : 6,806,644 B2
APPLICATION NO. : 10/192385
DATED : October 19, 2006
INVENTOR(S) : Masato Ueno et al.

It is certified that error appears in the above-identified patent and that said Letters Patent is hereby corrected as shown below:

Column 31, after line 23,
    insert the following paragraph:
--a frame-like member provided between the watch module and the watch case, along a peripheral portion of the watch case; -- .

Signed and Sealed this

First Day of August, 2006

JON W. DUDAS
*Director of the United States Patent and Trademark Office*